(12) United States Patent
Huthoefer et al.

(10) Patent No.: US 7,868,812 B2
(45) Date of Patent: Jan. 11, 2011

(54) SURVEILLANCE AND WARNING SYSTEM

(75) Inventors: Virginia Lorraine Huthoefer, Diamondhead, MS (US); Gerald Wallace Huthoefer, Diamondhead, MS (US)

(73) Assignee: Patriot Technologies, LLP, Diamondhead, MI (US)

( * ) Notice: Subject to any disclaimer, the term of this patent is extended or adjusted under 35 U.S.C. 154(b) by 1452 days.

(21) Appl. No.: 11/203,394

(22) Filed: Aug. 12, 2005

(65) Prior Publication Data

US 2009/0201190 A1    Aug. 13, 2009

(51) Int. Cl.
G01S 13/56 (2006.01)
G01S 13/04 (2006.01)
G01S 13/88 (2006.01)
G01S 13/00 (2006.01)

(52) U.S. Cl. ............................. 342/28; 342/27; 342/52; 342/59; 342/175; 342/195; 367/87; 367/93; 367/117; 256/4.01

(58) Field of Classification Search ............. 342/27–59, 342/175, 195; 340/945–983; 367/87, 93, 367/94, 117, 191; 375/130–153; 701/1, 701/120–122, 300, 301; 356/4.01–5.15
See application file for complete search history.

(56) References Cited

U.S. PATENT DOCUMENTS

| | | | | | |
|---|---|---|---|---|---|
| 3,971,025 | A | * | 7/1976 | Levine | 340/952 |
| 4,151,595 | A | * | 4/1979 | Pressiat | 701/120 |
| 4,481,516 | A | * | 11/1984 | Michelotti | 340/953 |
| 5,179,384 | A | * | 1/1993 | De Haan | 342/37 |
| 5,321,615 | A | * | 6/1994 | Frisbie et al. | 701/120 |
| 5,557,278 | A | * | 9/1996 | Piccirillo et al. | 342/29 |
| 6,282,488 | B1 | * | 8/2001 | Castor et al. | 701/120 |
| 6,359,583 | B1 | * | 3/2002 | Shamee | 342/33 |
| 6,462,697 | B1 | * | 10/2002 | Klamer et al. | 342/36 |
| 6,690,295 | B1 | * | 2/2004 | De Boer | 340/951 |
| 7,148,815 | B2 | * | 12/2006 | Derringer | 340/961 |
| 2006/0259232 | A1 | * | 11/2006 | Huthoefer et al. | 701/120 |

FOREIGN PATENT DOCUMENTS

GB    2165414 A  *  4/1986

* cited by examiner

*Primary Examiner*—Bernarr E Gregory
(74) *Attorney, Agent, or Firm*—Vedder Price P.C.; Ajay A. Jagtiani

(57) ABSTRACT

A system and method for providing entry-point, boundary-line, and presence intrusion detection by means of an intelligent controller process capable of driving both field alert/alarm systems and security station monitoring devices and for providing occupancy warnings and critical status alerts, one embodiment providing runway occupancy warnings and critical runway status alerts to both flight crew approaching an airfield and air traffic controllers managing ground traffic, the system including: a detection system, airfield output devices (including all FAROS, GAROS and CTAF Runway Occupancy Radio Signals (RORS)), an airfield communications network, a centralized data processing unit that contains all of the algorithms to drive light control, logging, and an optional administrative network layer that hosts a graphical user interface.

13 Claims, 15 Drawing Sheets

| Event | RW ZONE 1 | | | RW ZONE 2 | | | AIRFIELD RSODs (For All Systems) | | | |
| --- | --- | --- | --- | --- | --- | --- | --- | --- | --- | --- |
| | RW Zone Enter | RW Zone Hold | RW Zone Exit | RW Zone Enter | RW Zone Hold | RW Zone Exit | FAROS, CTAF-RORS ON | GAROS (HALs) ON | GAROS (TALs) ON | TIME OUT SEQUENCE STARTED |
| 1 | 1 | | | | | | X | X | | |
| 2 | | 1 | | | | | X | X | | |
| 3 | | | 1 | | | | Off | Off | | Optional |

| Event | RW ZONE 1 | | | RW ZONE 2 | | | AIRFIELD RSODs (For All Systems) | | | |
|---|---|---|---|---|---|---|---|---|---|---|
| | RW Zone Enter | RW Zone Hold | RW Zone Exit | RW Zone Enter | RW Zone Hold | RW Zone Exit | FAROS, CTAF-RORS ON | GAROS (HALs) ON | GAROS (TALs) ON | TIME OUT SEQUENCE STARTED |
| 1 | 1 | | | | | | X | X | | |
| 2 | | 1 | | | | | X | X | | |
| 3 | | | 1 | | | | Off | Off | | |

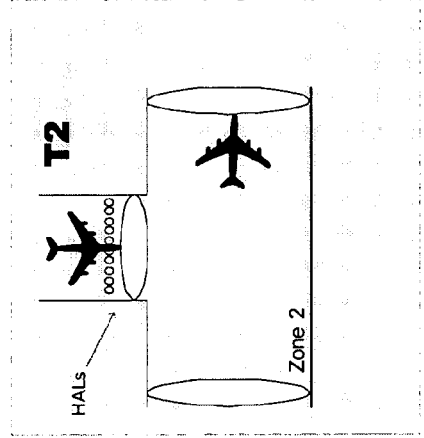
Figure 7a
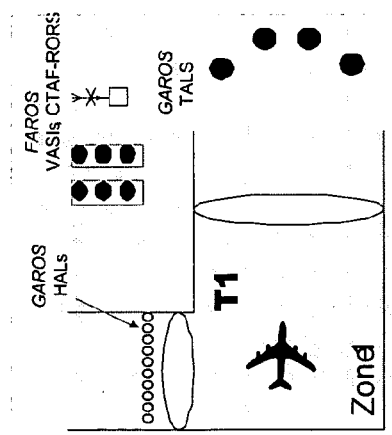
Figure 8
| Event | RW ZONE 1 | | | RW ZONE 2 | | | AIRFIELD RSODs (For All Systems) | | | |
|---|---|---|---|---|---|---|---|---|---|---|
| | RW Zone Enter | RW Zone Hold | RW Zone Exit | RW Zone Enter | RW Zone Hold | RW Zone Exit | FAROS, CTAF-RORS ON | GAROS (HALs) ON | GAROS (TALs) ON | TIME OUT SEQUENCE STARTED |
| 1 | 1 | | | | | | X | X | | |
| 2 | | 1 | | | | | X | X | | |
| 3 | | | | 2 | | | X | X | X | |
| 4 | | | 1 | | | 2 | X | X | OFF | |
| 5 | | | | | | | OFF | OFF | | |
Figure 7b

| | RW ZONE 1 | | | RW ZONE 2 | | | AIRFIELD RSODs (For All Systems) | | | |
|---|---|---|---|---|---|---|---|---|---|---|
| Event | RW Zone Enter | RW Zone Hold | RW Zone Exit | RW Zone Enter | RW Zone Hold | RW Zone Exit | FAROS, CTAF-RORS ON | GAROS (HALs) ON | GAROS (TALs) ON | TIME OUT SEQUENCE STARTED |
| 1 | 1 | | | | | | 1 | 1 | | |
| 2 | | 1 | | | | | 1 | 1 | | |
| 3 | | 1 | | 2 | | | 1,2 | 1,2 | 2 | |
| 4 | | 1 | | | | 2 | 1 | | | |
| 5 | | | 1 | | | | OFF | OFF | OFF | Optional |

| | HS ZONE | | | RW ZONE | | | AIRFIELD RSODs (For All Systems) | | | TOWER: GUI Alert (For Full System Only) | | | | | |
|---|---|---|---|---|---|---|---|---|---|---|---|---|---|---|---|
| | | | | | | | | | | Level I | | | Level 1 plus Level 2 | | |
| Event | HS Zone Enter | HS Zone Hold | HS Zone Exit | RW Zone Enter | RW Zone Hold | RW Zone Exit | FAROS, CTAF-RORS ON | GAROS (HALs) ON | GAROS (TALs) ON | Conflict Alert On | Hot/ Blind Spot ON | Forgotten Target ON | HS Icon | RW1 Icon | RW2 Icon |
| 1 | 1 | | | | | | | | | | | | 1 | | |
| 2 | | 1 | | | | | | | | | | | 1 | | |
| 3 | | | 1 | 1 | | | 1 | 1 | | | | | OFF | 1 | 1 |
| 4 | | | | | 1 | | 1 | 1 | | | | | | | |
| 5 | | | | | | 1 | OFF | OFF | | | | | | | OFF |

| Event | HS ZONE | | | RW ZONE | | | AIRFIELD RSODs (For All Systems) | | | TOWER: GUI Alert (For Full System Only) | | | | | |
|---|---|---|---|---|---|---|---|---|---|---|---|---|---|---|---|
| | | | | | | | | | | Level I | | | Level 1 plus Level 2 | | |
| | HS Zone Enter | HS Zone Hold | HS Zone Exit | RW Zone Enter | RW Zone Hold | RW Zone Exit | FAROS, CTAF-RORS ON | GAROS (HALs) ON | GAROS (TALs) ON | Conflict Alert On | Hot/Blind Spot ON | Forgotten Target ON | HS Icon | RW1 Icon | RW2 Icon |
| 1 | | | | 1 | | | 1 | 1 | | | | | | | |
| 2 | | 1 | | | 1 | | 1 | 1 | | | | | | | |
| 3 | 1 | | | | | | OFF | OFF | | | | | 1 | 1 | |
| 4 | | | 1 | | | 1 | | | | | | | OFF | OFF | |

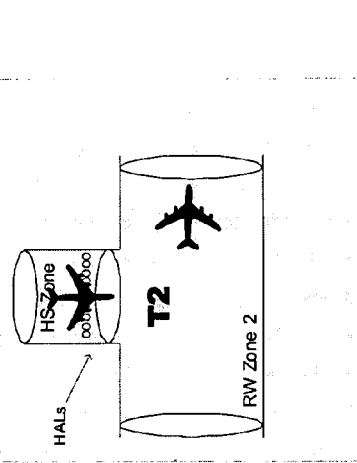
Figure 13a
| Event | RW ZONE 1 | | | RW ZONE 2 | | | AIRFIELD RSODs (For All Systems) | | | TOWER: GUI Alert (For Full System Only) | | | | |
|---|---|---|---|---|---|---|---|---|---|---|---|---|---|---|
| | | | | | | | | | | Level I | | | Level 1 plus Level 2 | |
| | RW Zone Enter | RW Zone Hold | RW Zone Exit | RW Zone Enter | RW Zone Hold | RW Zone Exit | FAROS, CTAF-RORS ON | GAROS (HALs) ON | GAROS (TALs) ON | Conflict Alert On | Hot/ Blind Spot ON | Forgotten Target ON | HS Icon | RW1 Icon | RW2 Icon |
| 1 | 1 | | | | | | 1 | 1 | | | | | | 1 | |
| 2 | | 1 | | | | | 1 | 1 | | | | | | 1 | |
| 3 | | 1 | | | 2 | | 1,2 | 1,2 | 1,2 | 1,2 | | | | 1 | 2 |
| 4 | | 1 | 1 | | | | 1 | 1 | | | | | | | |
| 5 | | | | | | 2 | OFF | OFF | OFF | OFF | | | OFF | OFF | OFF |
Figure 13b
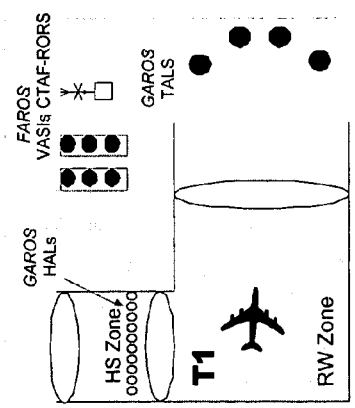
Figure 14

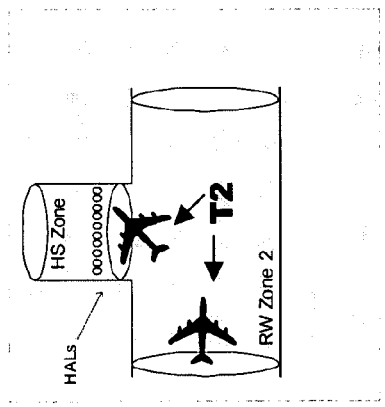
Figure 15a
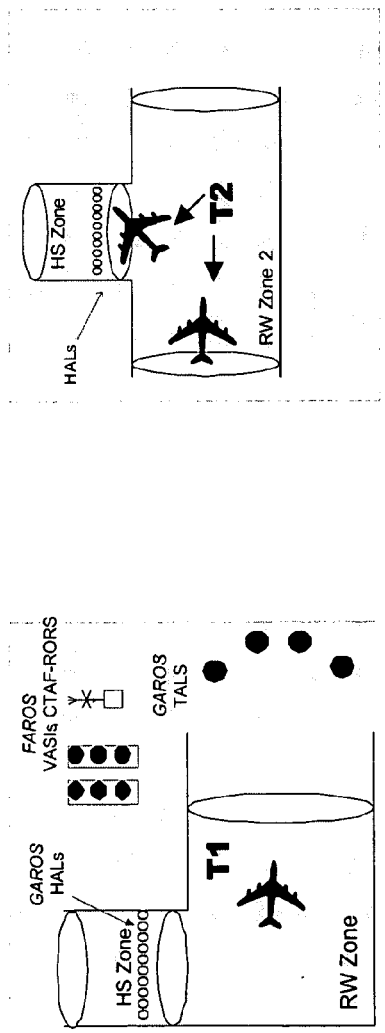
Figure 16
| Event | RW ZONE 1 | | | RW ZONE 2 | | | AIRFIELD RSODs (For All Systems) | | | | TOWER: GUI Alert (For Full System Only) | | | | |
|---|---|---|---|---|---|---|---|---|---|---|---|---|---|---|---|
| | | | | | | | | | | | Level I | | Level 1 plus Level 2 | | |
| | RW Zone Enter | RW Zone Hold | RW Zone Exit | RW Zone Enter | RW Zone Hold | RW Zone Exit | FAROS (VASIs) ON | GAROS (HALs, CTAF-RORS) ON | GAROS (TALs) ON | Conflict Alert On | Hot/ Blind Spot ON | Forgotten Target ON | HS Icon | RW1 Icon | RW2 Icon |
| 1 | 1 | | | | | | 1 | 1 | | | | | | | |
| 2 | | 1 | | | | | 1 | 1 | | | | | | 1 | |
| 3 | | 1 | | 2 | | | 1,2 | 1,2 | 1,2 | 1,2 | | | | 1 | 2 |
| 4 | | 1 | | | | 2 | 1 | 1 | | | | | | 1 | |
| 5 | | | 1 | | | | OFF | OFF | OFF | OFF | | | OFF | OFF | OFF |
Figure 15b

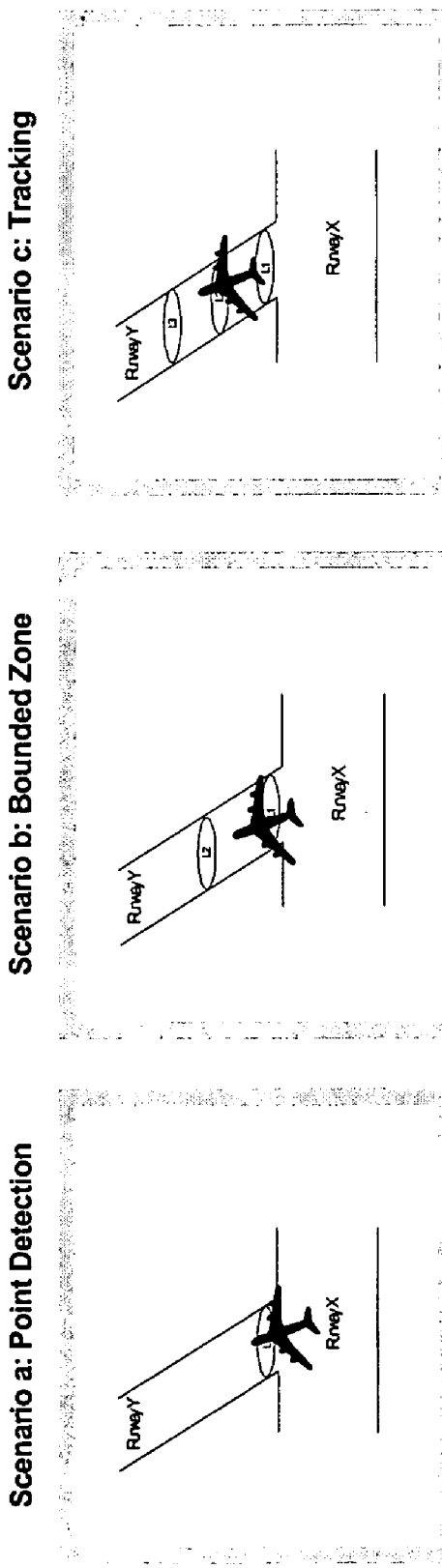

SURVEILLANCE AND WARNING SYSTEM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Prime Contract No. DTFA03-99-D-00017/0018, awarded by the Federal Aviation Administration (FAA) to The Titan Corporation, and as provided for by the terms of Subcontract No. 04-526 between The Titan Corporation and Patriot Technologies, LLC.

BACKGROUND OF THE INVENTION

1. Field of the Invention

The present invention relates generally to a system and method for providing perimeter security and, more specifically to a system and method for providing entry-point, boundary-line, and presence intrusion detection by means of an intelligent controller process capable of driving both field alert/alarm systems and security station monitoring devices. The system and method of the present invention is particularly applicable to use at airports but can also can be applied to perimeter security and presence-detecting security generally, including critical infrastructures such as chemical manufacturing plants, nuclear and non-nuclear power generation facilities, water purification plants, fuel storage installations, food processing plants, dams, and ports.

The present invention more specifically relates to a runway occupancy warning system (ROWS™) providing critical runway status alerts to both flight crew approaching an airfield and air traffic controllers managing ground traffic. The preferred components of a runway occupancy warning system include: a detection system consisting of one or more detection hubs (D-hubs), airfield output devices (including all Final Approach Runway Occupancy Signal (FAROS), Ground Alert Runway Occupancy Signal (GAROS) and Common Traffic Advisory Frequency (CTAF) Runway Occupancy Radio Signal (RORS)), an airfield communications network, and a runway operations processing electronics unit ("ROPE").

2. Description of the Related Art

Among the sensor technologies in use today for detecting target position information on airport runways is a radar-based surveillance system that is being used to help controllers monitor movement of aircraft and ground vehicles on the airport surface during low or no visibility conditions. The Airport Surface Detection Equipment (ASDE)-equipped airports represent the busiest airports with predominantly commercial air traffic and the most complex runway configurations.

Airport Movement Area Safety System (AMASS) is a software/hardware enhancement for the ASDE-3 radar system designed to assist air traffic controllers in the safe movement of aircraft by providing safety warnings and alerts of potential runway collisions. AMASS builds on the ASDE-3 radar information by providing visual data (identity) information and audible warning systems to alert air traffic controllers that a runway incursion is pending.

To meet surveillance needs at small to medium-sized airports, a new system, ASDE-X, was developed and has been contracted to be deployed at 25 additional airports. ASDE-X consists of a radar, a processor, non-radar sensors, and a display. It is designed to more precisely identify aircraft and vehicles on the ground than radar alone. ASDE-X was intended to provide a low-cost, scaled down feature set alternative to the ASDE-3/AMASS full surveillance system.

As part of the FAA's strategy to improve safety at U.S. airports, the agency initiated a collaborative movement with other members of the aviation industry to implement improvements in capacity and efficiency to meet future air traffic demand over the next decade. In the plan, the FAA identified 35 airports that best represent the goals of the Operational Evaluation Program (OEP) plan as the primary drivers of NAS performance in terms of system capacity. It is these OEP-35 airports that are being targeted for capacity improvements as implemented by the FAA for high-capacity commercial airports. Each of the OEP-35 airports already has installed, or is scheduled to have installed, an ASDE-3/AMASS or ASDE-X system.

The objective of the Airport Surface Detection Program is to design and deploy the ASDE-X surface surveillance system. The ASDE-X is a modular surface surveillance system that can process radar, multilateration and Automatic Dependent Surveillance-Broadcast (ADS-B) sensor data, which provides seamless airport surveillance to air traffic controllers. The ASDE-X system is targeted for second-tier airports and a Product Improvement/Upgrade for ASDE-3 Airport Movement Area Safety System airports. The FAA announced in June 2000 that the ASDE-X program would deploy 25 operational systems and 4 support systems. Additionally the ASDE-X Product Improvement/Upgrade for ASDE-3 sites will be deployed at 9 operational ASDE-3 sites, for a total of 34 operational systems and 4 support systems.

The goal of ASDE-X is to increase airport safety through enhanced air traffic control situational awareness. The ASDE-X conflict-detection equipment (with multilateration) provides detailed coverage of runways and taxiways, and alerts air traffic controller (visually and audibly) to potential collision alerts. The system depicts aircraft and vehicle positions using identification overlays on a color map showing the surface movement area and arrival corridors.

ASDE-X is an all-weather airport management system that provides aircraft location and identification to air traffic controllers. The system uses a combination of surface movement radar and transponder multilateration sensors to display aircraft position labeled with flight call-signs on an air traffic control (ATC) tower display.

The ASDE-X system provides fusion of multiple surveillance sources to support:

Positive correlation of flight plan information with aircraft position on controller displays Continuous surveillance coverage of the airport from arrival through departure ASDE-X Architecture The ASDE-X architecture consists of five core components: surface movement radar, multilateration, ADS-B, multi-sensor data processing and tower displays. The surface movement radar is the primary surveillance sensor that detects aircraft and vehicles on the airport surface. Multilateration is a secondary surveillance component that interacts with Mode S, air traffic control radar beacon system (AT-CRBS) or ADS-B-equipped aircraft and vehicles for identification and location information. ADS-B-equipped aircraft and vehicles automatically broadcast latitude and longitude, velocity, altitude, heading and identification using the Global Navigation Satellite System and aviation data links. The fusion of the radar, multilateration and ADS-B data enables the estimate of target location using multiple data sources. The ASDE-X system provides controllers with aircraft position, system status monitoring and decision support tools on a color tower display.

Multi-Sensor Data Processor (MSDP)

The ASDE-X multi-sensor data processor (MSDP) provides terminal and surface traffic picture by fusing data from one or more surface movement radars, a multilateration system with integral ADS-B sensors, flight plan data and one or more aircraft surveillance radars.

The MSDP is available in a dual, redundant configuration that features auto fail over and synchronized track identifiers. MSDP software runs on a Sun Microsystems workstation under the Unix-based Sun Solaris operating system.

ADS-B Transceiver

The ADS-B transceiver serves as the avionics link with the existing air traffic control infrastructure. The unit supports the 1090 MHz Extended Squitter (1090ES) or Universal Access Transceiver (UAT) standards to receive latitude and longitude, velocity, altitude, heading and identification as determined by aircraft avionics and the Global Navigation Satellite System (GNSS).

TABLE I

ASDE-X Specifications

ASDE-X System Specifications
Coverage:

Entire Movement Area (taxiway and runway)
up to 200 feet above ground level
Approach corridor for each runway from 5
miles out to the runway threshold up to 5,000
feet above ground level
System Update Rate:

One update per second
Track continuity of 99.5% over all tracks
System Target Capacity:

200 real targets
Mean Time Between Critical Failure:

2190 hours with a Mean Time to Repair of 30 min
Operating Temperature (outdoor equipment):

−35 to +66 degrees Celsius
Multilateration Specifications
Probability of Detection:

0.93 for all targets with transponders
Target Report Accuracy:

20 feet one sigma throughout surface
coverage area
Surface Movement Radar Specifications
Probability of Detection:

0.90 for all targets >3m2 RCS with a $10^{-6}$
probability of false alarm in all conditions up to 16
mm/hr rain
Target Report Accuracy:

Range accuracy of 6.6 feet root mean square (RMS)
Azimuth accuracy 0.05 degrees RMS
ATC Tower Display Specifications
Hardware:

| 21 inch color monitor | |
|---|---|
| Contrast ratio: | >1.7:1 at 6,000 ft |
| Viewing angle: | ±80 degrees |
| Luminance: | 1000 cd · m² at display surface |
| Software: | |

Configurable color and icons
Data recording and playback feature

The runway safety lights concept was first tried in the runway status lights program (RWSL) program at Boston Logan Airport in mid-1990. ATC was part of the RWSL team and was responsible for implementing the light control algorithms. That project used ASDE radar with AMASS as a surveillance source. A demonstration project at Boston-Logan Airport showed the viability of using runway safety lights at runway/taxiway intersections to raise a pilot's situational awareness. It was shown that safety lights driven by loop-based surveillance technology is possible. Light control timing was seen to be adequate for the proof-of-concept demonstration, but suffered minor deficiencies that would not be acceptable in an operational system. The primary solution to these timing issues would be provided by an improved communication system either through better wireless modems or hardwired communication links. Light logic parameter tuning was also considered an issue, and a greater period of tuning would have been appropriate.

Among the perimeter detection technologies available today, the more popular, available, and consequently lower-cost sensor technologies include fence vibration, taut-wire, and optical fiber technology. Also available are the more complex and expensive technologies, including electronic-field and capacitance-discharge sensor technologies. However, none of the conventional detection technologies provides a flexible and scalable system or method for collecting data from a variety of sensor components and communicating that information to an intelligent (i.e., rules-based) communications network, such as a central security processor, or that has the capability to drive a variety of lighting output devices as well as graphical interfaces, such as security monitors or mobile hand-held devices. Further, none of the conventional perimeter detection technologies can easily incorporate the use of a combination of sensor technologies or can easily fuse data from motion or ground sensors or can easily, when placed within a perimeter boundary, reinforce fence-line detection and expand perimeter detection. None of the conventional perimeter detection technologies acquires the data from multiple types of sensors, converts the data into a common format, and then processes the commonly formatted data according to predefined rules that drive outputs.

SUMMARY OF THE INVENTION

The present invention relates generally to a sensor system and, more specifically to a system and method for providing entry-point, boundary-line, and presence intrusion detection by means of an intelligent controller process capable of driving both field alert/alarm systems and security station monitoring devices. The system provides a stable data acquisition platform covering geographically distributed areas, with central "rules-based" processing and decision-making capabilities. The system utilizes a single or multiple generic data acquisition hub(s) supporting a diverse array of facility-selectable sensor options and interfaces. The base hub configuration supports bipolar and linear analog voltage (±10 VDC), analog current (4-20 ma), analog outputs (±10 VDC), (digital I/O (programmable transition detection, state/level change, current source, and current sink), and supports common I/O module rack (analog/digital) compatibility (i.e., OPTO-22, CRYDOM®, GORDOS, and others.).

A central processor provides a common communications and data gathering system with "rules based" analysis of the gathered data to generate local and remote action commands, and a system status output, which is logged/recorded to provide system operation records. This output is also provided to the local area network to provide for attachment of an optional graphical user interface (GUI). The commands may be global or local and the result(s) discrete or public as configured by the user.

Communications between the hubs and the central processor preferably takes place over an Ethernet wide area network, operated on fiber optic cable, wireless bridge, or CAT5 copper, depending on the user's installation needs and security requirements.

An optional GUI completes the system and may be installed co-resident with the central processor or at a remote, convenient to the user, location. The GUI is installed using a local area network, which may be constructed on fiber optic or copper cable or a secure wireless link. Like the central processor, the GUI is built on a common platform, which provides the underlying communication protocols, data-parsing interpreter, and data logging/recording software. The selected GUI image, soft switches and indicators are constructed to use the "rules-based" processing and data output from the central processor.

Perimeter Security Embodiment

In one embodiment of the system, according to the present invention, a series of detectors, either all of the same type or including a variety of different types, are preferably grouped to form perimeter security areas ("PSAs") that overlap to provide overlapping adjacent security areas to provide system redundancy of preferably 50%. Each detector is connected, preferably by hard wiring, to a local area security hub ("LASH") to form desired overlapping patterns.

Each LASH provides DC power and receives analog real-time data from the connected detectors. The LASH converts the analog detector data to digital and passes the data to a central security processor ("CSP") over a field network. Each LASH also processes its detector data to determine the status of the associated PSA integrity and the detector status. Each LASH also preferably has a power-on LED and has relay outputs to control local area lighting, such as rotating beacons, audio alarms, or illumination lighting controls.

Preferably, the CSP is built around a high reliability single board computer (SBC) that executes software under an embedded operating system, preferably LINUX®, which continually processes all detection and surveillance data to derive and catalog perimeter data patterns, thereby building a dynamic model of the ambient environment. Through this continuous refinement, the system according to the invention will reduce the number of false alerts and alarms.

The CSP may also be connected to a primary graphical user interface ("GUI"). When this interface is used to provide connectivity to an optional administrative network, the primary GUI is installed on the administrative network. The CSP provides a number of relay outputs for lighting controls, rotating beacons, and audio alerts/alarms. An RS-232 serial COM port can be included for wire line or wireless notification to applicable security personnel of alerts/alarms.

The CSP also preferably contains a media converter to translate the "copper-based" Ethernet to fiber optics. The CSP may also interface with existing gate access systems, directly or via the administrative network, to provide access control and status for remote gates via the LASH and a field network. The system also supports the addition of video, voice and text communications.

The perimeter access security system according to the present invention also comprises a field network, which functions as the central artery of the system. The local area security hub preferably operates a commercial off-the-shelf (COTS), high reliability CSP SBC, and the same LINUX®-based software as the CSP to gather and process data from its PSA. The LASH also contains a media controller to translate its Ethernet interface to the field network fiber. In addition to installed detection and surveillance equipment, the LASH provides I/O for existing gate access authorization hardware and issues gate commands when authorized. If desired, video cameras, voice communications and text messaging panels may be installed and are supported by the CSP and LASH.

For installations covering extensive territory, an optional GUI can be used to provide configuration and management of the security system. A wireless network could be used to provide the link between the CSP and the primary GUI or the administrative network. Depending on the location of the CSP, superior wireless links may be available.

Runway Occupancy Warning System Embodiment

In another embodiment of the system according to the present invention, a runway occupancy warning system ("ROWS™"), provides critical runway and status alerts to both flight crew approaching an airfield and air traffic controllers managing ground traffic. The primary components of such a runway occupancy warning system include: a detection system consisting of one or more detection hubs, airfield output devices (including all FAROS, GAROS, and CTAF-RORS signals), an airfield communications network, and a central processor, called, in this embodiment, a runway operations processing electronics unit ("ROPE").

The runway occupancy warning system according to the present invention includes a centralized data processing unit that contains all of the algorithms to drive light control, logging, and an optional administrative network layer that hosts the GUI. The airfield alert system can stand alone to operate without an air traffic control tower, or can be used in combination with an air traffic controller surveillance system, such as a GUI, to provide full tower and airfield detection capabilities.

The ROWS™ detection system interfaces with multiple COTS sensing technologies, including but not limited to: inductive loops, ground pressure detectors, infrared scanning and fixed beams, ranging radars targeted along the center line of the runway, and position radars to cover defined airfield zones. The system achieves flexibility through the design of the detection hubs and through the processing algorithms of the centralized logic controller and data processing unit, also referred to as runway operations processing electronics ("ROPE").

The detection hubs ("D-hubs") contain the system electronics and will be deployed at each end of a runway to be monitored along the length of the runway, as required, to achieve coverage of the runway crossings. The total number of D-hubs required depends upon the selected runway configuration. Each D-hub may be configured to interface with up to 128 sensors, including 16 inductive loops, pressure or beam sensors, and one or more radar inputs, depending upon the radar interface design.

The D-hub also provides relays for control of up to 8 runway status output devices. Each D-hub, deployed for a ROPE runway, communicates the status of each connected sensor device and the 8 control relays to, and receives relay controls from, the ROPE approximately every 100 milliseconds, via a TCP/IP or UDP or other suitable protocol.

The Runway Status Output Devices (RSOD) encompass all desired lighting, radio, or graphical user output devices that are driven by the central processor from the data collected from the airfield sensors. There are three classifications of airfield RSODs including FAROS, GAROS, and CTAF-RORS output devices.

FAROS signals address enhanced surveillance needs for pilots and flight crew on final approach to an airfield by providing either a visual or audible airfield signal when the runway is occupied and conditions are not safe for landing. FAROS include but are not limited to: modified Precision Approach Path Indicators (PAPI) and Visual Alert Slope Indicator (VASI) lighting signals.

GAROS signals address enhanced surveillance needs for ground traffic preparing to enter a runway by providing a visual airfield signal to targets holding short or preparing to takeoff that the runway is occupied and not safe to enter. GAROS include Hold Short Alert Lights (HALs), and Take-off Alert Lights (TALs).

The Common Traffic Advisory Frequency (CTAF) is a community local radio frequency used by pilots when approaching an airfield to relay approach and takeoff information to other airfield and flight crew personnel. In the ROWS™ embodiment, the airfield system would transmit digital voice recordings (Runway Occupancy Radio Signals or RORS) over the CTAF to provide runway status information such as when an airplane or vehicle had entered a runway. A typical CTAF voice recording could include the airport identification, runway identification, and occupancy status.

In a full tower and airfield surveillance system, RSODs also will include an air traffic control GUI output device that resides on the administrative network layer and that displays target position on a monitor for the air traffic controller. Data for the GUI is generated in the ROWS™ system central processing component, ROPE, and is "pushed" to the GUI to provide state updates for the tower alert system.

Airfield system and related output devices shall have the capability to be manually disabled either temporarily on a timer process, or permanently through a manual switch located on each end of the airfield. Personnel who may be on the movement areas for longer than normal by a manual switch located on each end of the airfield may manually turn on airfield output devices by a manual switch located on each end of the airfield.

Airfield communications are achieved using either a fiber link or a wireless link. Due to the length of the physical communications links and the necessary data reliability requirements, the ROWS™ system architecture is designed around a fiber optic communication link. When fiber is installed, each D-hub is fitted with a COTS media converter to translate the D-hub Ethernet to the fiber. D-hub(s) using TCP/IP or UDP or other type communications protocols are fitted with a COTS media converter. The ROPE retranslates the D-hub communications using media converters and a COTS router.

To facilitate rapid deployment for system evaluation or temporary operations, or to coordinate installation construction schedules, the ROWS™ system design also accommodates the use of COTS spread-spectrum radio frequency (RF) communications links. While it is believed the spread spectrum solution provides similar reliability and availability to the recommended fiber, the potential for missed data and communications delays requires that extensive testing be done to determine the potential for interference to or from routine airfield and aircraft operations and communications.

The ROPE is the "brain" or central processing component of the ROWS™ system. A ROPE is deployed for each runway, receiving raw detection and status data from each D-hub deployed to monitor part of the runway, intersecting runways, taxiways, airport roads, or designated hot spots. The ROPE is configured on installation with detection zones defined by a series of sensors. Thus, one sensor may be used in the definition of multiple zones, including zones located on adjacent runways.

For multi-runway installations, a ROPE is installed for each runway. All ROPES communicate using the airfield network, providing a logical path for co-runway sensor data and where necessary, indicator coordination. The ROPE processes the sensor status data to derive zone status, including number and direction of targets, outputs the indicator commands to the connected D-hub, and provides updated zone status to the optional GUI, if installed.

The administrative communications network is the communications path for the optional GUI. The link may be directly connected between the ROPE and the optional GUI or include a router to provide for remote, view only, GUI(s) and remote collection of ROPE history data. Depending upon the selected installation location of the ROPE, the administrative communications network may be Ethernet, copper, fiber or the optional wireless.

Features of the optional graphical user interface preferably include a touch screen and three operational levels:

The first level will represent the default level at system startup, and will be the operational environment that is used in good visibility conditions. The first level of alert includes: conflict alert (visual and audible alert initiated any time a conflict occurs; rules for conflict alert can be modified to adapt to operational needs); forgotten target alert [visual and audible alert initiated for any target on runway in position for more than x minute(s)]; and hot spot (visual and audible alert initiated any time a target moves into a predefined hot/blind spot zone).

The second level represents the operational environment used during low-visibility conditions. Under level 2, all equipped zones become active. One-time audible alert initiated when target enters runway zone only; no audible for hold short zones. All Level 1 alerts remain in effect.

The third level represents the restricted access mode that enables a controller to: 1) provide a visual reminder on the GUI that a runway is being occupied for an extended period (e.g., runway inspection, construction); and 2) to manually turn on airfield FAROS, GAROS, and CTAF alerts in the same case.

In addition to multiple operational alert levels, the GUI preferably has the capability to reset the airfield system by zone or by system.

For a full ROWS™ system, it is recommended that either presence or directional boundary sensors be configured into the detection design of the system for specific use on the runways. This option is recommended so that runway zones can effectively be used to turn on and off airfield lighting (enabling the system to detect landovers), and to provide both critical point position and direction for targets taxiing on the runway.

It is accordingly an object of the present invention to provide a new and improved system and method for detecting incursion by an object across a boundary or at an entry point, and/or for detecting the presence of an object within a selected area or at an entry point, and for providing a notification signal responsive to an incursion or presence, or both, by means of an intelligent controller process capable of driving field alert/alarm systems and/or security station monitoring devices.

It is also an object of one embodiment of the system and method according to the present invention to provide a series of detectors, either all of the same type or including a variety of different types, preferably grouped to form perimeter security areas ("PSAs") that overlap to provide overlapping adjacent security areas to provide system redundancy of preferably 50%, each detector being connected, preferably by hard wiring, to a local area security hub ("LASH") to form desired overlapping patterns.

Another object of an embodiment of the present invention is to provide a runway occupancy warning system that provides critical runway and status alerts to both flight crew approaching an airfield and air traffic controllers managing ground traffic.

Yet another object of an embodiment of the present invention is to provide a centralized data processing unit that contains all of the algorithms to drive light control, logging, and an optional administrative network layer that hosts a GUI.

Still another object of an embodiment of the system and method of the present invention is to provide an airfield alert system that can stand alone to operate without an air traffic control tower, or can be used in combination with an air traffic controller surveillance system, to provide full airfield detection capabilities.

Another object of an embodiment of the present invention is to provide a detection system that interfaces with multiple COTS sensing technologies, including but not limited to: inductive loops, ground pressure detectors, infrared scanning and fixed beams, ranging radars targeted along the center line of the runway, and position radars to cover defined airfield zones.

Still another object of an embodiment of the system and method of the present invention is to provide flexibility through the design of the detection hubs and through the processing algorithms of the centralized logic controller and data processing unit, also referred to as runway operations processing electronics ("ROPE").

Another object of an embodiment of the present invention is to provide a full tower and airfield surveillance system having RSODs that also will include an air traffic control GUI output device that resides on an administrative network layer and that displays target position on a monitor for the air traffic controller, data for the GUI being generated in the ROWS™ system central processing component, ROPE, and being "pushed" to the GUI to provide state updates for the tower alert system.

Yet another object of an embodiment of the system and method of the present invention is to provide an airfield runway occupancy warning system and related output devices that have the capability to be manually disabled either temporarily on a timer process, or permanently through a manual switch located on each end of the airfield.

Another object of an embodiment of the system and method of the present invention is to facilitate rapid deployment for system evaluation or temporary operations, or to coordinate installation construction schedules by having the ROWS™ system design accommodate the use of COTS spread-spectrum RF communications links.

Still another object of an embodiment of the system and method of the present invention is to provide ROPE as the "brain" or central processing component of the ROWS™system, a ROPE being deployed for each runway, receiving formatted detection and status data from each D-hub deployed to monitor part of the runway, intersecting runways, taxiways, airport roads, or designated hot spots, and being configured on installation with detection zones defined by a series of sensors that may be used in the definition of multiple zones, including zones located on adjacent runways.

Yet another object of an embodiment of the system and method of the present invention is to provide ROPES that communicate using the airfield network, providing a logical path for co-runway sensor data and, where necessary, indicator coordination, processes the sensor status data to derive zone status, including number and direction of targets, outputs the indicator commands to the connected D-hub, and provides updated zone status to the optional GUI, if installed.

Another object of an embodiment of the system and method of the present invention is to provide a runway occupancy warning system that will transmit, to targets on final approach to an airfield, a digital voice recording, over CTAF, indicating an occupied runway.

Other objects and features of the present invention will become apparent from the following detailed description of an embodiment of the invention, considered in connection with the accompanying drawings. It is to be understood, however, that the drawings are designed as an illustration only and not as a definition of the limits of the invention.

BRIEF DESCRIPTION OF THE SEVERAL VIEWS OF THE DRAWINGS

In the drawings, wherein similar reference characters denote similar elements throughout the several views:

FIGS. 7a and 8 represent a schematic plan view of an airport surface movement scenario showing multiple aircraft (1 departing and 1 crossing mid-field) for a non-towered airfield.

FIG. 7b is a table showing a sequence of runway events and corresponding ROWS system responses for multiple aircraft (1 departing and 1 crossing mid-field) at a non-towered airfield.

FIGS. 13a and 14 represent a schematic plan view of an airport surface movement scenario showing multiple aircraft (1 departing and 1 crossing mid-field) for a towered airfield without existing surveillance equipment.

FIG. 13b is a table showing a sequence of runway events and corresponding ROWS system responses for multiple aircraft (1 departing and 1 crossing mid-field) at a towered airfield without existing surveillance equipment.

FIGS. 15a and 16 represent a schematic plan view of an airport surface movement scenario showing multiple aircraft (1 departing and 1 land-over) for a towered airfield without existing surveillance equipment.

FIG. 15b is a table showing a sequence of runway events and corresponding ROWS system responses for multiple aircraft (1 departing and 1 land-over) for a towered airfield without existing surveillance equipment.

FIG. 17 represents a schematic plan view of an airport surface movement scenario showing a single aircraft moving over a ROWS-equipped "point" zone at a towered airport with existing surveillance equipment.

FIG. 18 represents a schematic plan view of an airport surface movement scenario showing a single aircraft moving over a ROWS-equipped "bounded" zone at a towered airport with existing surveillance equipment.

FIG. 19 represents a schematic plan view of an airport surface movement scenario showing a single aircraft moving over a ROWS-equipped "tracking" zone at a towered airport with existing surveillance equipment.

DETAILED DESCRIPTION OF A PREFERRED EMBODIMENT

Figure 2:
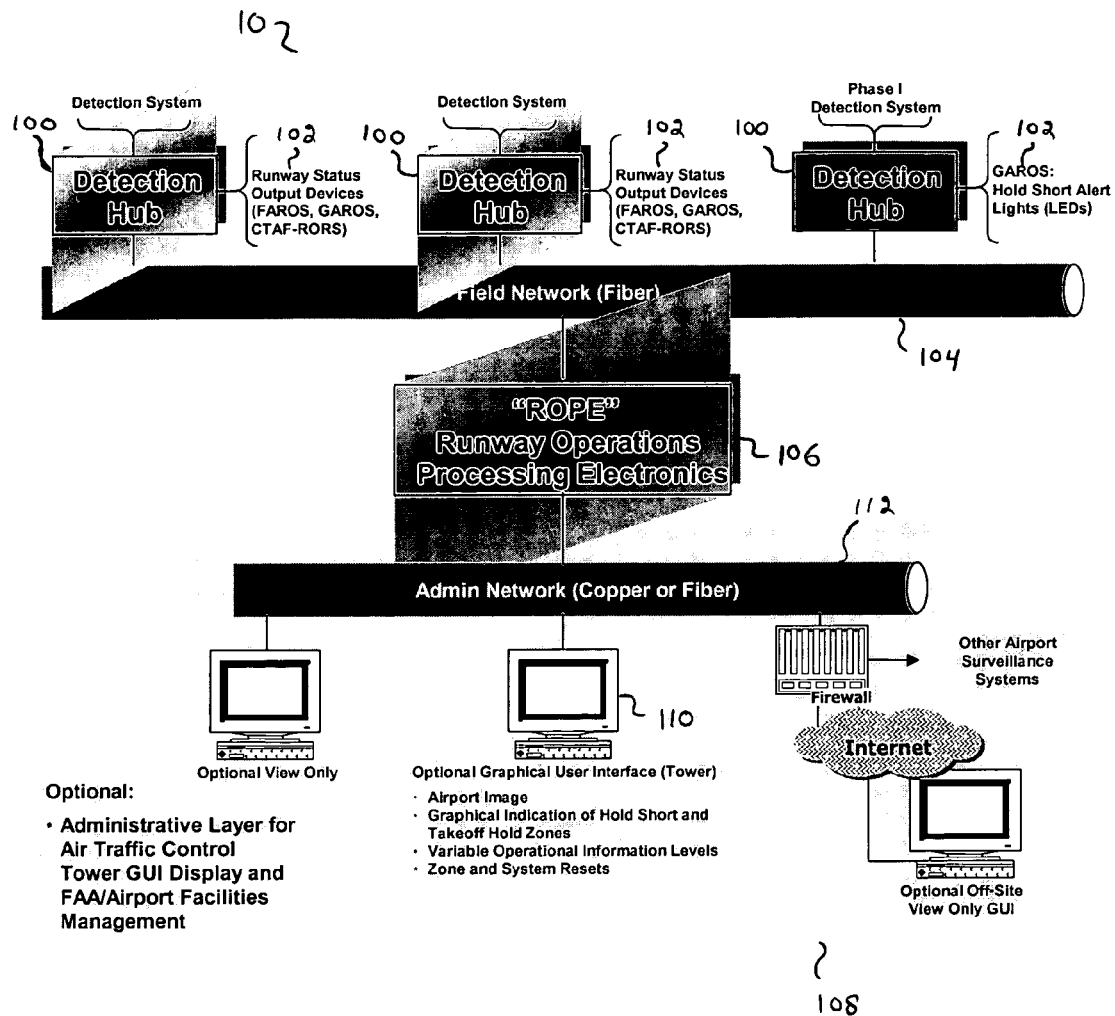
FIG. 2 is a schematic drawing showing the high-level system architecture of an embodiment of a runway occupancy warning system according to the invention.
Figure 3:
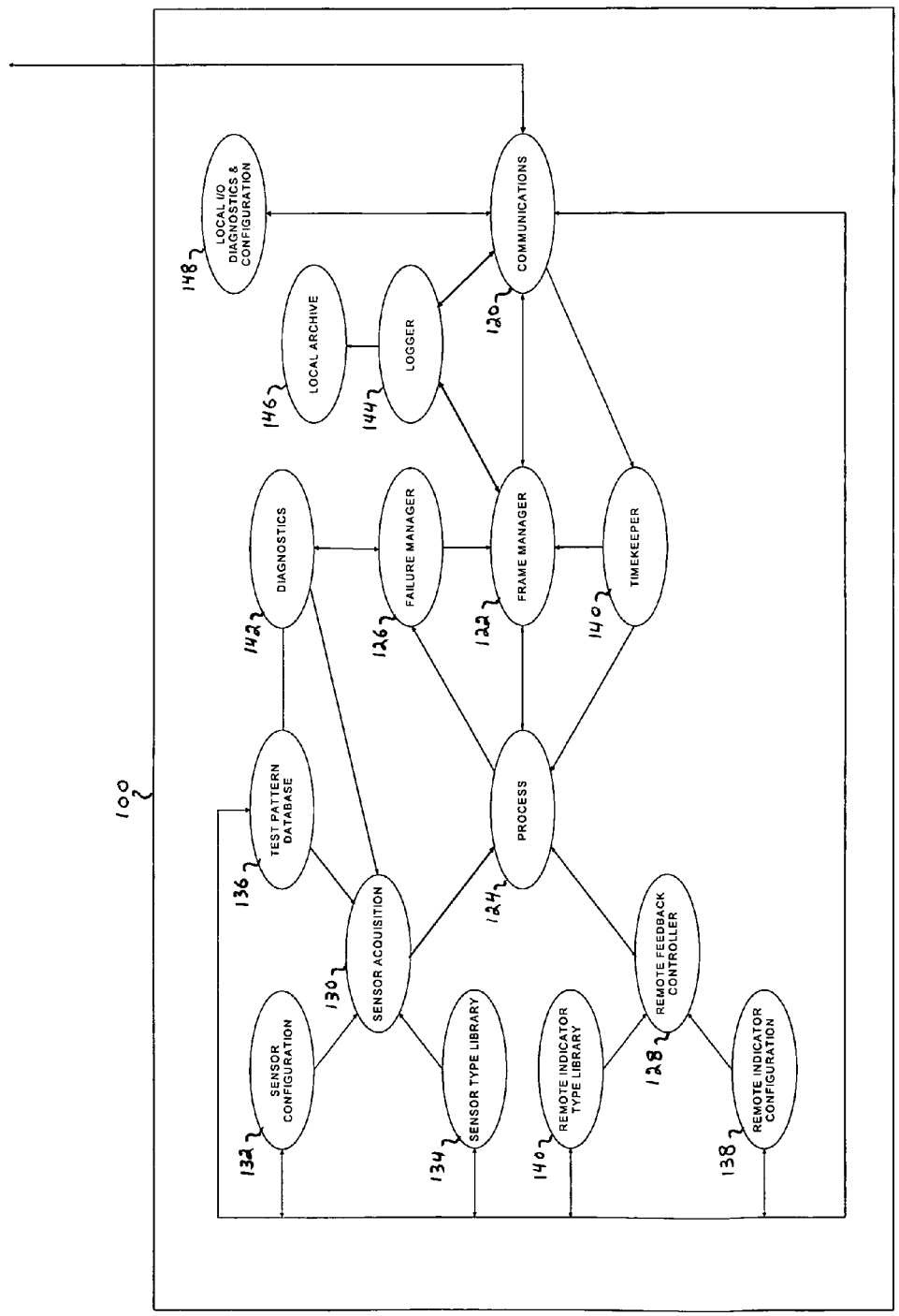
FIG. 3 is a schematic diagram of an intelligent data acquisition hub according to the invention, showing the various modules and their interconnections.
Figure 4A:
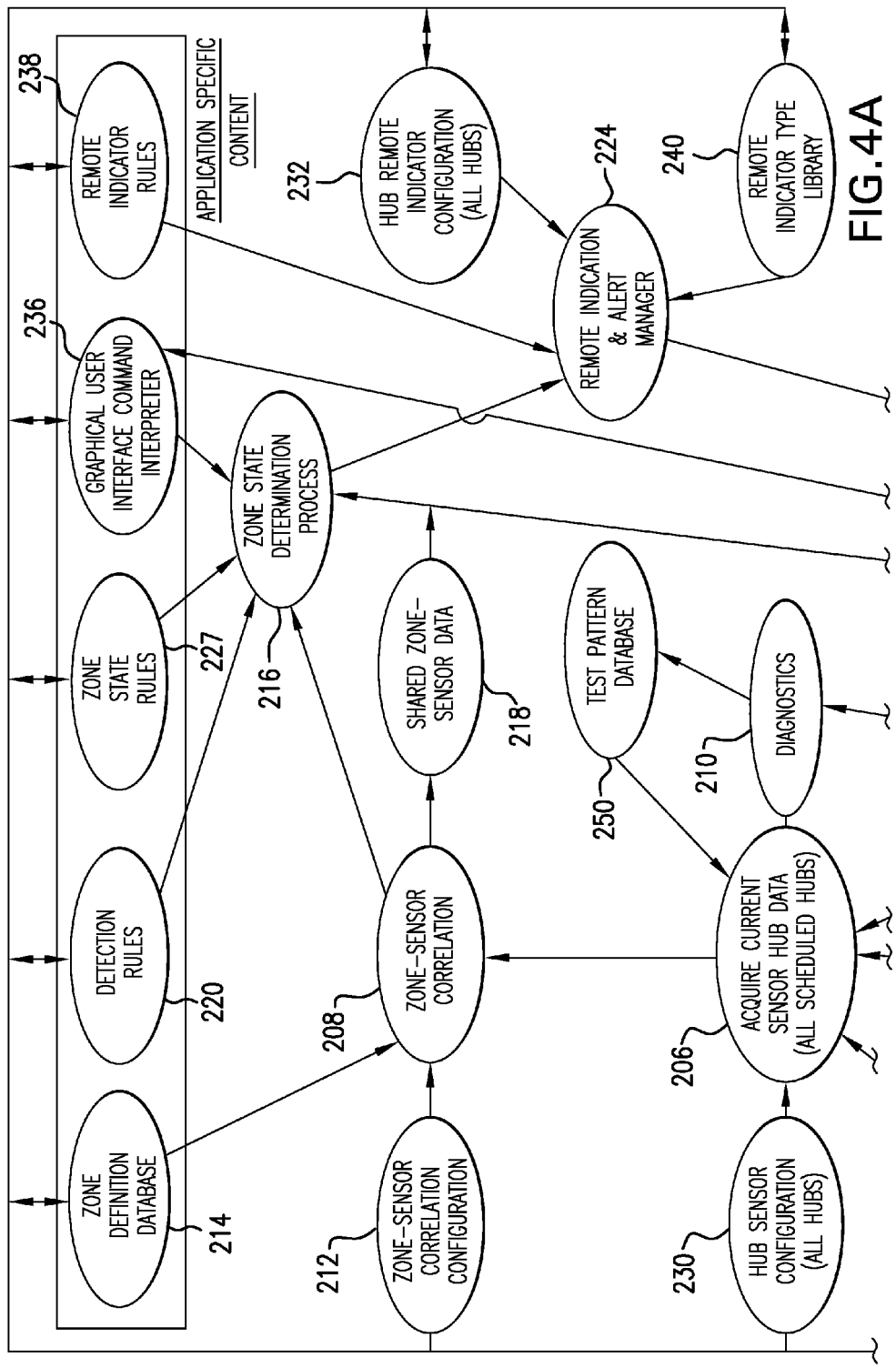
FIG. 4 is a schematic diagram of a central processor according to the invention, for use with the intelligent data acquisition hub shown in FIG. 3, showing the various modules and their interconnections.
Figure 4B:
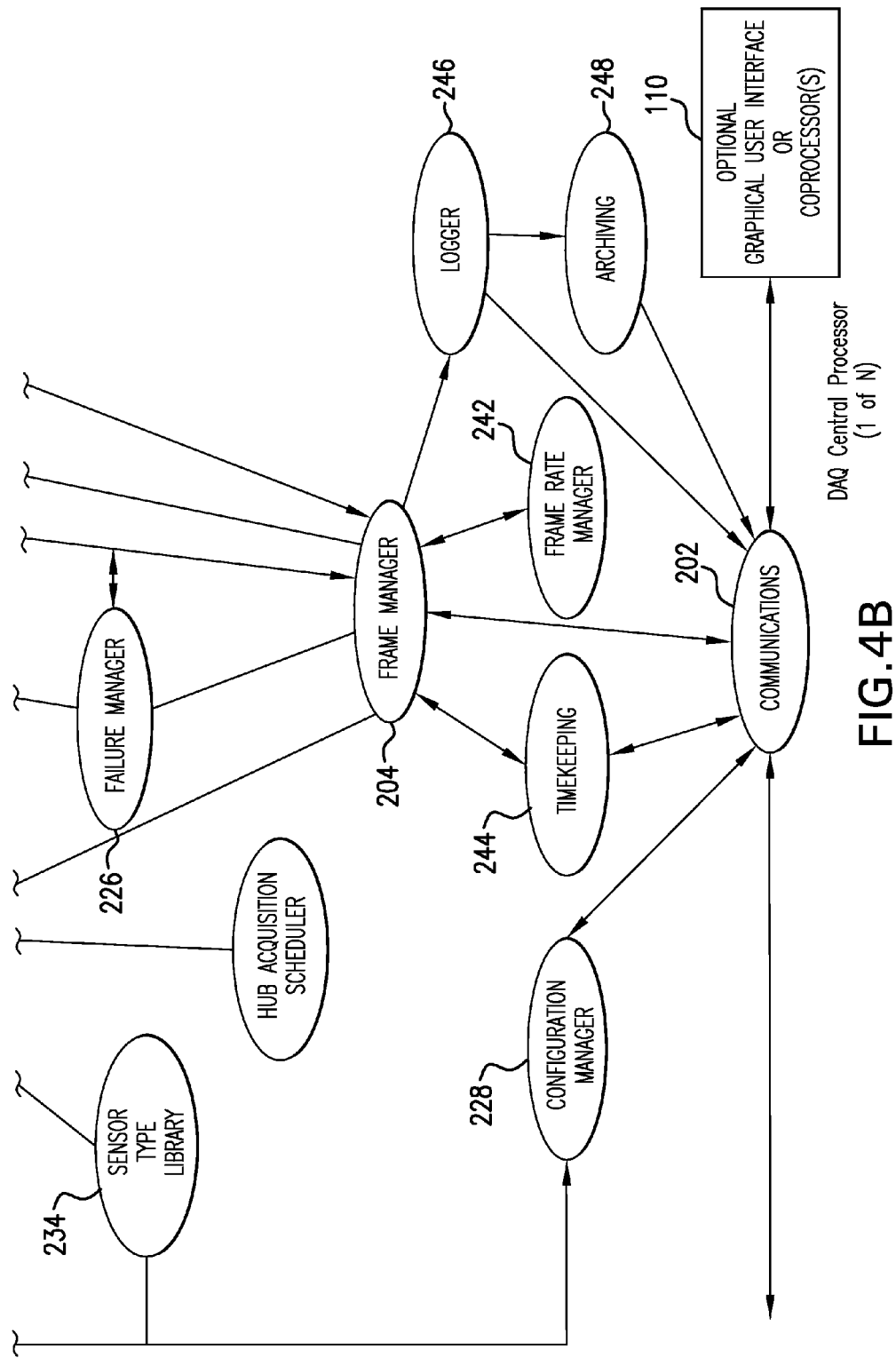
Figures 5A, 5B:
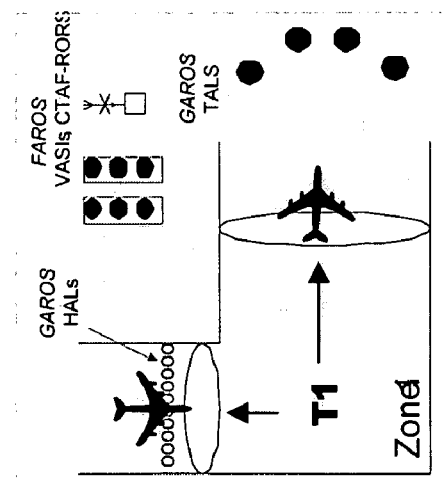
FIG. 5a is a schematic plan view of an airport surface movement scenario showing a single departing aircraft for a non-towered airfield.
FIG. 5b is a table showing a sequence of runway events and corresponding ROWS system responses for a single departing aircraft at a non-towered airfield.
Figures 6A, 6B:
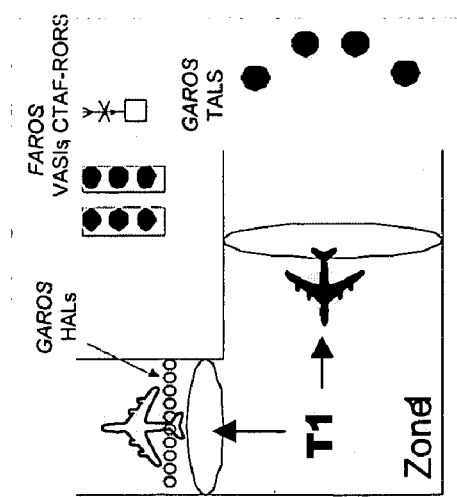
FIG. 6a is a schematic plan view of an airport surface movement scenario showing a single arriving aircraft for a non-towered airfield.
FIG. 6b is a table showing a sequence of runway events and corresponding ROWS system responses for a single arriving aircraft at a non-towered airfield.
Figures 9A, 9B, 10:
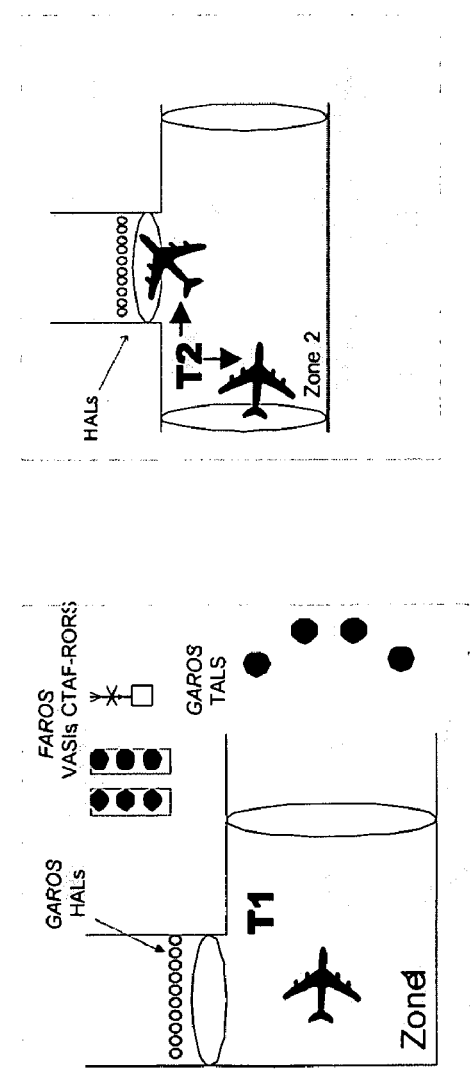
FIGS. 9a and 10 represent a schematic plan view of an airport surface movement scenario showing multiple aircraft (1 departing and 1 land-over) for a non-towered airfield.
FIG. 9b is a table showing a sequence of runway events and corresponding ROWS system responses for multiple aircraft (1 departing and 1 land-over) for a non-towered airfield.
Figures 11A, 11B:
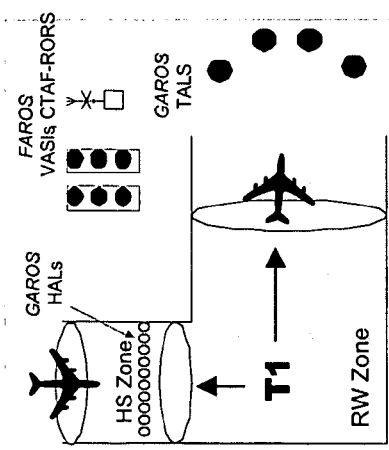
FIG. 11a is a schematic plan view of an airport surface movement scenario showing a single departing aircraft for a towered airfield without existing surveillance equipment.
FIG. 11b is a table showing a sequence of runway events and corresponding ROWS system responses for a single departing aircraft at a towered airfield without existing surveillance equipment.
Figures 12A, 12B:
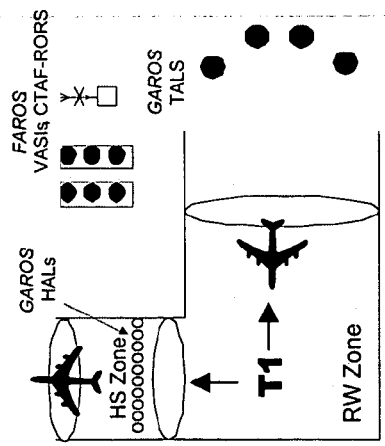
FIG. 12a is a schematic plan view of an airport surface movement scenario showing a single arriving aircraft for a towered airfield without existing surveillance equipment.
FIG. 12b is a table showing a sequence of runway events and corresponding ROWS system responses for a single arriving aircraft at a towered airfield without existing surveillance equipment.

In a preferred embodiment of the system according to the present invention, as shown schematically in FIGS. 2, 3, and 4, an airfield runway occupancy warning system 10 provides critical runway status alerts to both flight crew approaching an airfield and air traffic controllers managing ground traffic. The primary components of such a runway occupancy warning system (ROWS™) include: a detection system consists of one or more detection hubs 100, airfield output devices 102 (including all FAROS, GAROS, and CTAF-RORS signals), an airfield communications network 104, and a runway operations processing electronics unit ("ROPE") 106.

The runway occupancy warning system 10 can stand alone to operate without an air traffic control tower, or can be used in combination with an air traffic controller surveillance system 108, such as a GUI 110, to provide full tower and airfield detection capabilities.

As shown in FIG. 4, the runway occupancy warning system according to the present invention includes a centralized data processing unit 200 that contains all of the algorithms to drive light control, logging, and an optional administrative network layer that hosts the GUI.

The ROWS™ detection system interfaces with multiple COTS sensing technologies, including but not limited to: inductive loops, ground pressure detectors, infrared scanning and fixed beams, ranging radars targeted along the center line of the runway, and position radars to cover defined airfield zones. The system achieves flexibility through the design of the detection hubs 100 and through the processing algorithms of the centralized logic controller and data processing unit 200, also referred to as runway operations processing electronics ("ROPE") 106.

The D-hubs 100 contain the system electronics and will be deployed at each end of the runway to be monitored along the length of the runway, as required, to achieve coverage of the runway crossings. The total number of D-hubs required depends upon the selected runway configuration. Each D-hub may be configured to interface with up to 128 sensors, including 16 inductive loops, pressure or beam sensors, and one or more radar inputs, depending upon the radar interface design.

The D-hub 100 also provides relays for control of up to 24 runway status output devices ("RSOD"). Each D-hub, deployed for a ROPE's runway, communicates the status of each connected sensor device and the 8 control relays to, and receives relay controls from, the ROPE every 100 milliseconds, via a TCP/IP interface.

The RSOD 102 encompass all desired lighting, radio, or graphical user output devices that are driven by the central processor from the data collected from the airfield sensors. There are three classifications of airfield RSODs including FAROS, GAROS and CTAF-RORS output devices.

FAROS signals address enhanced surveillance needs for pilots and flight crew on final approach to an airfield by providing either a visual or audible airfield signal when the runway is occupied and conditions are not safe for landing. FAROS include but are not limited to: modified PAPI/VASI lighting signals, and CTAF-RORS.

GAROS signals address enhanced surveillance needs for ground traffic preparing to enter a runway by providing a visual airfield signal to targets holding short or preparing to takeoff that the runway is occupied and not safe to enter. GAROS include Hold Short Alert Lights (HALs), and Take-off Alert Lights (TALs).

In a full tower and airfield surveillance system, RSODs also will include a tower GUI output device 110 that resides on the administrative network layer 112 and that displays target position on a monitor for the air traffic controller. Data for the GUI 110 is generated in the ROWS™ system central processing component, ROPE 106, and is "pushed" to the GUI to provide state updates for the tower alert system.

Airfield system and related output devices shall have the capability to be manually disabled either temporarily on a timer process, or permanently through a manual switch located on each end of the airfield. Personnel who may be on the movement areas for longer than normal by a manual switch located on each end of the airfield may manually turn on airfield output devices by a manual switch located on each end of the airfield.

Airfield communications are achieved using either a fiber link 104 or a wireless link. Due to the length of the physical communications links and the necessary data reliability requirements, the ROWS™ system architecture is designed around a fiber optic communication link. When fiber is installed, each D-hub is fitted with a COTS media converter to translate the D-hub Ethernet to the fiber. D-hub(s) using TCP/IP or other communication protocols are fitted with a COTS media converter to convert the copper Ethernet to fiber optics. The ROPE retranslates the D-hub communications using media converters and a COTS router.

To facilitate rapid deployment for system evaluation, temporary operations, or to coordinate installation construction schedules, the ROWS™ system design also accommodates the use of COTS spread-spectrum RF communications links While it is believed the spread spectrum solution provides similar reliability and availability to the recommended fiber, the potential exists for missed data, due to interference to or from routine airfield and aircraft operations and communications, and for communications delays.

The ROPE 106 is the "brain" or central processing component of the ROWS™ system 10. A ROPE 106 is deployed for each runway, receiving raw detection and status data from each D-hub 100 deployed to monitor part of the runway, intersecting runways, taxiways, airport roads, or designated hot spots. The ROPE is configured on installation with detection zones defined by a series of sensors. Thus, one sensor may be used in the definition of multiple zones, including zones located on adjacent runways.

For multi-runway installations, a ROPE is installed for each runway. All ROPES communicate using the airfield network, providing a logical path for co-runway sensor data and where necessary, indicator coordination. The ROPE processes the sensor status data to derive zone status, including number and direction of targets, outputs the indicator commands to the connected D-hub, and provides updated zone status to the optional GUI, if installed.

The administrative communications network 112 is the communications path for the optional GUI. The link may be directly connected between the ROPE and the optional GUI or include a router to provide for remote, view only, GUI(s) and remote collection of ROPE history data. Depending upon the selected installation location of the ROPE, the administrative communications network may be Ethernet, copper, fiber or the optional wireless.

Features of the optional graphical user interface 110 include a touch screen and three operational levels:

- The first level will represent the default level at system startup, and will be the operational environment that is used in good visibility conditions. The first level of alert includes: conflict alert (visual and audible alert initiated any time a conflict occurs; rules for conflict alert can be modified to adapt to operational needs); forgotten target alert [visual and audible alert initiated for any target on runway in position for more than x minute(s)]; and hot spot (visual and audible alert initiated any time a target moves into a predefined hot/blind spot zone).
- The second level represents the operational environment used during low-visibility conditions. Under level 2, all equipped zones become active. One-time audible alert initiated when target enters runway zone only; no audible for hold short zones. All Level 1 alerts remain in effect.
- The third level represents the restricted access mode that enables a controller to: 1) provide a visual reminder on the GUI that a runway is being occupied for an extended period (e.g., runway inspection, construction); and 2) to manually turn on airfield FAROS, GAROS, and CTAF-RORS alerts in the same case.

In addition to multiple operational alert levels, the GUI will have the capability to reset the airfield system by zone or by system.

Table I summarizes the ROWS™ II output device features.

TABLE I

ROWS ™ System Features

| Acronym | Description |
| --- | --- |
| RSOD | Runway Status Output Devices. The RSODs include all FAROS signals as well as any runway status alerts for airfield personnel (e.g., embedded light emitting diodes (LEDs) at the hold short line, runway entrance lights (RELs), and takeoff alert lights that warn of an occupied runway. |
| GAROS | Ground Alert Runway Occupancy Signal. The purpose of GAROS signals are to alert taxiing aircraft and ground vehicles (collectively, "targets") of an occupied runway. GAROS devices include, but are not limited to hold short alert lights or takeoff alert lights. HALs alert targets holding short of a runway that the runway is not safe to enter. TALs are placed on the runway at the "position and hold" box to warn aircraft in "position and hold" when a runway has been breached by a second target downfield. |
| FAROS | Final Approach Runway Occupancy Signal. The purpose of FAROS signals are to alert aircraft on final approach of an occupied runway. FAROS devices include, but are not limited to: VASI's, PAPIs. |
| HALs | Hold Short Alert Lights. A lighting system of embedded LED signals installed parallel to the taxiway hold short line that is designed to flash red to a target in a "hold short" position when the runway has become occupied. |
| TALs | Takeoff Alert Lights. Light system installed on the runway at the edge of the "position and hold" box that is designed to activate a warning signal to a target in "position and hold" when a runway has become dangerous because a $2^{nd}$ downfield target has entered the runway. |
| CTAF-RORS | Common Traffic Advisory Frequency. Community local radio frequency used by pilots when approaching an airfield to relay approach and takeoff information to other airfield and flight crew personnel, used primarily for non-towered applications or after tower closes. |
| GUI | Graphical User Interface for Air Traffic Control Tower |
| GUI Level 1 | Level 1 alerts notify ATC of Conflict (two or more targets on runway) Hot/Spot Entry Forgotten Target |
| GUI Level 2 | Level 2 alerts provide full system target location. Designed primarily for low-visibility conditions. |
| GUI Level 3 | Level 3 provides Runway Restricted Access Alert. Designed to provide visual reminder of a closed runway, runway under inspection, or temporarily occupied runway. |

Functional Module Descriptions for all Embodiments

1. Data Acquisition Hub

The data acquisition hub component 100 may be replicated and installed as required to provide the necessary sensor interfaces and controls to collect data for the entire area of interest. Each hub controls, monitors, and collects data from each connected sensor, formats its collected data into the current sensor update frame, transfers the frame to the assigned central processor and records each frame to a local log/archive. In addition, the hub receives remote field indicator update frames from the central processor, decodes the various remote indicator states and assigns the appropriate electrical configuration to each remote indicator to comply with the assigned state. Feedback of each remote indicator state may be included in the gathered sensor update frame if the appropriate sensors are installed. A representative description of each software functional module follows. In practice, various modules may be combined as necessary.

Communications

The communications module 120 interfaces with the network transport protocol, TCP or UDP, managing the transmission and reception of frames, originating from or destined to the frame manager 122, between nodes listed in the IP Address table. Requests to connect and data received, from unlisted IP addresses are discarded and the sending IP address is blocked.

Frame Manager

The frame manager 122 assembles the outgoing data, and decodes incoming, frames into the appropriate frame format specified in the interface control document ("ICD"). Outgoing frames are passed to the communications module 120 for transmission. Incoming frame data may contain remote indicator state(s), sensor or remote indicator configuration, sensor or remote indicator library updates. The frame manager may also receive a discard frame flag from the timekeeper should the send and receive times for the frame exceed allowable specification. If three successive frames are discarded, the frame manager informs the failure manager that frame communications are unreliable with the sending node.

Processing

The processing module 124 implements the necessary algorithms when the hub sensor installation includes sensors and/or remote indicator devices requiring preprocessing, such as CTAF runway occupancy radio signal (RORS), tracking video and lighting. The module also processes the sensor fault/failure algorithm(s) passing the sensor and remote indicator status to the failure manager 126. Preprocessed sensor data and sensor data not requiring preprocessing are passed to the frame manager 122. Processed data used to drive remote indicator devices, such as CTAF-RORS and the like are passed to the remote feedback controller 128.

Sensor Acquisition

The sensor acquisition module 130 uses data from the sensor configuration 132 to derive its list of sensors to be sampled for each frame. Sensor interface specifications, software commands, and other unique sensor information are pulled from the sensor type library 134. The sensor acquisition module 130 acquires each sensor's data and appends the data to the sensor number and type. The resulting information is forwarded to the process module 124. In diagnostic mode, the sensor acquisition module 130 is provided "known condition" sensor input data from the test pattern database 136. Test pattern data is processed and passed on the same as "live" data.

Remote Indicator Feedback Controller

The remote indicator feedback controller 128 derives its list of installed devices from the remote indicator configuration 138 and the specifications of operation of each installed device from the remote indicator library 140. Using this data, the remote indicator feedback controller 128 executes the enable/disable state for each device as provided by the central processor 200 or processing module 124.

Timekeeper

Clock synchronization is normally provided to the hub operating system through network layer node synchronization. The timekeeper module 140 provides backup to the network synchronization by checking the time embedded in each received frame header. The timekeeper also monitors send and receive time for each frame. If the difference exceeds the allowable delay in the system specifications, the timekeeper sets the discard flag to the frame manager.

Failure Manager

The failure manager 126 monitors status indications from the frame manager 122, processing 124, diagnostics 142 and communications 120 modules. These flags indicate the immediate health of the hub, its installed sensors and indicators. The frame manager 122, based on these health flags, compiles the diagnostic word(s) to be sent with each sensor update frame to the central processor 200. These words contain the device(s) and fault codes to allow the central processor to determine the impact of the fault/failure and issue the appropriate fault notifications.

Logger

The logger module 144 maintains in a continuous loop a specified period of sensor update and remote indicator update frames. Following transfer to the communications module 120, by the frame manager 122 and prior to flushing, sensor frames are copied to the logger 144. Received remote indicator update frames are copied to the logger 144 prior to decoding by the frame manager 122. Prior to rolling the loop period, the logger transfers its contents to the archiving module 146. Configuration and library updates are not logged.

Local Archive

The local archive module 146 receives the logger content and appends it to the ongoing archive of hub data. The archive may be retrieved over the network, off-line, using a network compatible laptop computer, over the network while the system is offline. Retrieval of archive data while the system is on-line may induce latency resulting in system faults.

Sensor Configuration

The sensor configuration module 132 contains a list of the installed sensors, assigned sensor number and type. This data is normally loaded into the sensor configuration module 132 during hub/sensor installation. Configuration data may be loaded locally, using a laptop computer connected to the local I/O port, on-line over the network from the central processor executing a configuration update. The sensor configuration may be updated by a downloaded text file or directly using a text editor.

Sensor Type Library

The sensor type library 134 is loaded upon system initialization and contains a list of available sensors, tested and accepted, for use with the iDAQ™ System. The library contains the type of sensor interface, the sensor power, control, input and output specifications, software commands, if required, for sensor operation, default state, output data format and failure detection data.

Remote Indicator Type Library

The remote indicator type library 140 contains the same information for the available remote indication devices for use with the iDAQ™ System. The library is downloaded to the hub during initialization.

Remote Indicator Configuration

The remote indicator configuration 138 contains the list of installed remote indicators, assigned number and type for the hub.

Test Pattern Database

The test pattern data base 136 contains a number of sensor data patterns to permit testing of the hub independent of, or in conjunction with, other system hubs. The test pattern sensor data is clocked to the sensor acquisition module 130 under control of the diagnostic module 142. Once the data is passed to the sensor acquisition module 130, processing continues normally through the hub and the resulting sensor update frames are sent to the central processor 200.

Diagnostic Controller

The diagnostic controller 142 provides test pattern selection, control, and synchronization, with additional hubs under test, for testing. The controller compares the results of the test-data-derived preprocessed data and passes any fault/failures to the failure manager 126. The controller 142 also runs verification routines to test articulated and illuminated remote indication devices, again passing the fault/failure information to the failure manager 126. During real-time operations, the diagnostic controller 142 monitors the operation, illumination, cycle rates and movement of all sensors and remote indicators, providing real-time notification of degradations and failures.

Local I/O (Diagnostics & Configuration)

The local I/O 148 provides software control, security, and interfacing for technician connectivity to the hub using the local Ethernet or serial communications port. Only pre-authorized laptop computers may access the hub via the local Ethernet port. The serial port may be accessed using any serial terminal device. However, configuration updates or other system commands and uploads can only be done with the proper authorization key.

2. Central Processor Component

The central processor component 200 of an intelligent data acquisition system of an embodiment of the invention may be replicated and installed, as required, in a parallel-pyramid hierarchy to provide rules-based data processing to determine the state of zones of interest, and to derive remote and local indications to interested user(s). A representative description of each software functional module follows. In practice, various modules may be combined as necessary.

Communications

The communications module 202 interfaces with the network transport protocol, TCP or UDP, managing the transmission and reception of frames, originating from or destined to the frame manager 204, between nodes listed in the IP address table. Requests to connect and data received from unlisted IP addresses are discarded and the sending IP address is blocked.

Frame Manager

The frame manager 204 assembles the outgoing data and decodes incoming frames into the appropriate frame format specified in the ICD. Outgoing frames are passed to the communications module 202 for transmission. Incoming frame data may contain sensor update data, configuration data, or graphical user interface user commands. The frame manager may also receive a discard frame flag from the timekeeper should the send and receive times for the frame exceed allowable period specification. If three successive frames are discarded, the frame manager informs the failure manager that frame communications are unreliable with the sending node.

Hub Sensor Frame Acquisition

During initialization, the hub sensor frame acquisition module 206 compiles the system sensor data frame using the combined hub sensor configuration data and sensor type library. During operation, the frame manager 204 passes the decoded sensor data, contained in each hub's sensor update frame, to the hub sensor frame acquisition module 206, which updates the combined sensor data frame to reflect the current sensor data values. Following the update, the combined sensor frame is passed to the zone-sensor correlation module 208.

During diagnostic operations, the combined sensor frame is also provided to the diagnostics controller 210 for comparison with the stored test pattern data.

Zone-Sensor Correlation

The zone-sensor correlation module 208 sorts the sensor data in accordance with the zone-sensor configuration database 212 and the zone definition database 214. Sensors shared by multiple zones are replicated and inserted as required to group each zone's sensor data in sequence. The resulting zone sorted sensor data is passed to the zone state determination module 216. Sensors, flagged as shared between central processor level nodes, i.e., adjacent or distributed systems, are replicated in a shared zone-sensor frame and passed to that module 218 for further processing.

Zone State Determination

The zone-sensor data is passed to the zone state module 216, which uses the detection rules 220 and zone state rules 222 to determine what condition the current zone-sensor data indicates. Once determined, the resulting zone state data is passed to the remote indication & alert manager 224 and the frame manager 204 for further processing.

Remote Indicator & Alert Manager

The remote indicator and alert manager 224 uses zone state data received from the zone state determination module 216 along with the remote indication rules 226 to determine if alerts and/or remote indications are required. User alerts are passed to the frame manager 204 for inclusion in the zone update frame and are displayed on an optional Graphical User Interface 110, if installed and so configured.

Remote indicators are installed and controlled via the hubs 100. A variety of indicators may be installed at various locations to provide the required system outputs, indications, or warning. Indicators may also be unique to specific hub locations. To determine which indicators to activate or deactivate the remote indicator and alert manager uses the combined hub indicator configuration and remote indicator type library. Once determined, the remote indicator & alert manager 224 passes the data to the frame manager 204 for inclusion in the remote indicator update frame issued to each hub.

Failure Manager

The failure manager 226 monitors status indications from the frame manager 204, diagnostics 210 and communications 202 modules, indicating the immediate health of the central processor. The frame manager 204, based on the health data received from the failure manager 226, compiles and inserts diagnostic word(s) in the zone state update frame. These words contain the device(s) and fault codes to allow an optional Graphical User Interface device 110 to display the appropriate user notification of the fault/failure.

Shared Zone-Sensor Data

Some anticipated iDAQ™ system applications might require multiple pods of hubs managed by individual central processors. In such an application the potential for shared zones and/or shared sensors might also exist. To meet this contingency, the shared zone-sensor data module 218 receives the shared zone and sensor data, passes it to the frame manager 204 along with the destination of the data for frame compilation.

Configuration Manager

During system initialization, the configuration manager 228 polls each hub for its current sensor and remote indicator configuration. The configuration manager 228 then compiles the combined configurations and passes the results to the hub/sensor 230 and hub/remote indicator configuration 232 memories.

Sensor Type Library

The sensor type library 234 is loaded upon system initialization and contains a list of available sensors, tested and accepted, for use with the iDAQ™ System. The library contains the type of sensor interface, the sensor power, control, input and output specifications, software commands, if required, for sensor operation, default state, output data format and failure detection data. This library is the same as the hub library.

Hub/Sensor Configuration

The hub/sensor configuration memory 230 contains the combined sensor configuration of all connected hubs. The data includes the hub #, sensor ID and sensor type. This configuration is used with the sensor type library to identify and process the correct sensor data for sensor-zone correlation and zone state determination.

Sensor-Zone Correlation Configuration

The sensor-zone correlation configuration 212 is determined during system layout and installation. The data includes the hub #, sensor ID, presence/boundary flag, zone #, and zone boundary #.

Zone Definition Database

The zone definition database 214 contains the data necessary to define each zone monitored by the iDAQ™ system. The database includes the zone number, number of boundaries, type of zone, specific alerting and/or indication flags.

Sensor Detection Rules

The sensor detection rules 220 detail the system application specific rules used to interpret the sensor data for each type of sensor. This may, or may not, differ from the generic sensor type detection data contained in the sensor type database.

Zone State Rules

The zone state rules 220 detail the application specific interpretation of zone status based on the combined sensor values associated with the zone.

Graphical User Interface Command Interpreter

If an optional Graphical User Interface, "GUI", is installed and includes user controls, user selections are passed to the command interpreter 236 from the frame manager following decoding of the GUI frame. The GUI command interpreter determines and issues the necessary instructions to the zone state determination 216, remote indicator & alert manager 224, and frame manager 204 to implement the desired user operation(s).

Remote Indicator Rules

The remote indicator rules 238 detail the application specific condition(s), based on zone state determination results, for the remote indicators and user alerts.

Hub/Remote Indicator Configuration

The hub/remote indicator configuration memory 232 contains the combined remote indicator configuration of all connected hubs. The data includes the hub #, remote indicator ID and remote indicator type. This data, along with the remote indicator library 240, is used to identify remote indicator types and locations to issue the correct state commands to configure the remote indicators for the desired response(s) and alerts.

Remote Indicator Type Library

The remote indicator type library 240 contains the same information for the available remote indicator devices for use with the iDAQ™ System. The library is identical to the hub library.

Frame Rate Manager

Many iDAQ™ applications are data intensive, but not latency critical, permitting the frame rate to fluctuate. When enabled, the frame rate manager 242 intercedes with the frame manager 204 to increase pod frame rate until sufficient time is allowed for the completion of all hub and central processing functions within a single frame. The frame rate manager 242 continues to monitor frame transfer status to adjust frame rate, optimizing performance.

Timekeeping

The timekeeping module 244 in the central processor provides verification of all connected nodes by monitoring the difference between the send time set in each incoming frame header and the actual receipt time. If the time difference exceeds the application specific time delta specification, the timekeeper 244 sets the discard flag for the incoming frame to the frame manager 204 and the frame rate manager 242, if enabled.

The timekeeping module 244 also provides a backup to the network layer time synchronization, monitoring the GPS time reference and comparing the system time to determine whether it is within the application specific specification. A warning and alarm time error delta point is set in the timekeeping module 244, at which error flags are set to the failure manager 226.

Logger

The logger module 246 maintains continuous loop for an application specified period of the frame update and remote indicator update frames. Following transfer to the communications module 202 by the frame manager 204 and prior to flushing the frames are copied to the logger 246. If an optional GUI is installed, the received GUI user request frames are copied to the logger 246 prior to decoding by the frame manager. Prior to rolling the loop period, the logger 246 transfers its contents to the archiving module 248. Configuration and library updates are not logged. Optional configuration parameters permit the additional logging of the compiled sensor frame.

Archiving

The local archive module 248 receives the logger content and appends it to the ongoing archive of central processor data. The archive may be retrieved via the local network interface, on or off-line, using a network compatible, preauthorized, laptop computer. The archive contains all data logged over the archive period.

Diagnostic Manager

The diagnostic controller 210 provides test pattern selection, control, and synchronization with each hub that is required to provide sensor test pattern data to generate the correct zone state update and remote indicator frames. The diagnostic controller 210 compares the selected test pattern results with the "known" frame result(s) stored in the test pattern database 250 for the selected test pattern(s).

Test Pattern Database

The test pattern database 250 stores the "known" zone frame update and remote indicator update frames for the application specific iDAQ™ installation. The patterns are designed to test the iDAQ™ and application specific processing rules thoroughly. This is done, using sequentially more complex sensor data patterns from a single hub/sensor input through the entire hub/sensor suite pod inputs, recreating each possible detection and tracking, if installed, scenario. Fault can be isolated to the individual sensor, hub, and processor level.

Method of Operation of the Runway Occupancy Warning System Embodiment

In operation, the ROWS™ system according to the present invention can accommodate airport surface movement scenarios for each of three operational applications: non-towered fields, towered fields without ASDE/AMASS, and towered fields with ASDE/AMASS. The scenarios describe a sequence of runway events and the corresponding ROWS™ system responses. Each section contains an application matrix that identifies runway incursion error type, causal factors, affected users and a mitigation category linked to ROWS™ system features used during the operational sequence.

Each scenario presents detection zones on the runway and, in the case of towered airports, additionally at the taxiway hold short threshold. These zones can be defined by boundary or presence sensors. The functionality of the detection algorithms, or safety logic, is directly related to the capabilities of the sensor technology.

The simplest form of detection is by boundary. Boundary detection using inductive loops or infrared beams provide limited capabilities due to the inherent limitations of entry/exit logic. A single crossing of a boundary sensor without verification from a second sensor to vectorize the direction fails to provide consistent detection logic useful to determine accurate movement of the target on the runway. Consequently, with a simple boundary design without directional sensor design, runway loops can only be used to turn off airfield outputs such as FAROS, GAROS, and CTAF-RORS.

For a full ROWS™ system, it is recommended that presence or directional boundary sensors, or both, be configured into the detection design of the system for specific use on runways. This option is recommended so that runway zones can effectively be used to turn on and off airfield lighting (enabling the system to detect landovers), and to provide both critical point position and direction for targets taxiing on the runway.

Non-Towered Airfields

Four scenarios for non-towered fields are presented in this section:

Departing aircraft (See Drawing 5*a* and Table II)
Arriving aircraft (See Drawing 6*a* and Table III.)
Multiple aircraft with a downfield active runway crossing. (See Drawings 7*a* and 8 and Table IV)
Multiple aircraft land over. (See Drawings 9*a* and 10 and Table V)

Each type of airfield has an associated application matrix that identifies runway incursion error type, causal factors, affected users and a mitigation category linked to ROWS™ system features used during the operational sequence. (See Table VI). Each of the four scenarios has an associated logic table. (See Drawings 5*b*, 6*b*, 7*b*, and 9*b*.)

TABLE II

Mitigation Scenario for Non-towered Airfield: Departing Aircraft
Departing Target 1 Enters/Exits Unoccupied Runway Zone

| Event Description | Objectives | | Sequence of Events |
|---|---|---|---|
| Departing target approaching unoccupied runway on departure roll | Send visual alert to taxiing and approaching aircraft that runway is occupied | 1, 2) | Ground target taxis into position and holds in detection zone 1. Output devices including all FAROS, GAROS, and CTAF-RORS are triggered to alert both ground and approaching traffic that runway is now occupied. |
| | | 3) | Ground target exits position and hold zone 1. All FAROS, GAROS, and CTAF-RORS alerts turn off unless optional timing sequence is initiated |

TABLE III

Mitigation Scenario for Non-Towered Airfield: Arriving Aircraft
Arriving Target 1 Enters/Exits Unoccupied Runway Zone

| Event Description | Objectives | | Sequence of Events |
|---|---|---|---|
| Landing/arriving target exiting unoccupied runway | Send visual alert to all ground and approaching aircraft that runway is occupied | 1) | Ground target approaches detection zone 1. Output devices, including all FAROS and GAROS, are triggered to alert both ground and approaching traffic that runway is now occupied |
| | | 2) | Ground target exits detection zone 1. All FAROS, GAROS, and CTAF-RORS alerts instantly turn off |

TABLE IV

Mitigation Strategy for Non-Towered Airfield: Multiple Aircraft with a Downfield Active Runway Crossing Downfield Crossing onto Active Runway

| Event Description | Objectives | | Sequence of Events |
|---|---|---|---|
| Target 1 holding in takeoff position Downfield target 2 holding short of runway is not aware of $1^{st}$ target already on runway | Send visual alert to all ground and approaching aircraft that runway is occupied | 1, 2) | Ground target approaches and enters detection zone 1. Output devices, including all FAROS, GAROS, and CTAF-RORS, are triggered to alert both ground and approaching traffic that runway is now occupied |
| | | 3) | Ground target 2 disregards HALs and enters runway. TALs turn on alerting target 1 to abort takeoff |
| | | 4) | Ground target 2 exits detection zone 2. TALs turn off, but all FAROS, GAROS, and CTAF-RORS remain on due to presence of target 1 in zone 1 |
| | | 5) | Ground target 1 exits detection zone 1. All FAROS, GAROS, and CTAF-RORS turn off, unless optional timer is initiated. |

TABLE V

Mitigation Scenario for Non-Towered Airfield: Multiple Aircraft Landover
Ground Target 1 in Takeoff Position; Landing Target 2 Enters Occupied Runway (Landover)

| Event Description | Objectives | | Sequence of Events |
|---|---|---|---|
| Target 1 holding in takeoff position Landing Target 2 lands over Target 1 onto occupied runway and subsequently exits runway | Send visual alert to all ground and approaching aircraft that runway is occupied | 1, 2) | Ground target approaches and enters detection zone 1. Output devices, including all FAROS, GAROS, and CTAF-RORS, are triggered to alert both ground and approaching traffic that runway is now occupied |
| | | 3) | Ground target 2 "lands over" target 1 at a downfield location, crossing into detection zone 2. TALs turn on alerting target 1 to abort takeoff |
| | | 4) | Ground target 2 exits runway. TALs turn off; all FAROS, GAROS, and CTAF-RORS alerts remain on due to presence of Target 1 in zone 1 |
| | | 5) | Ground target 1 exits detection zone 1. All FAROS, GAROS, and CTAF-RORS alerts turn off |

TABLE VI

ROWS ™ Application Matrix for Non-towered Airport (No GUI)

| ROWS ™ Feature | User Affected | Error Type | Causal Factor Addressed | Mitigation Category |
|---|---|---|---|---|
| FAROS: VASI/PAPI | Pilot on Approach | PD-4 | Target enters runway when an approaching aircraft is landing | Prevention |
| CTAF-RORS | Pilot on Approach | PD-4 | Target enters runway when an approaching aircraft is landing | Prevention |
| GAROS: HALs | Taxiing Pilot at HS | PD-2 | Target fails to hold short of the runway and crosses or taxies into position on the runway | Prevention |
| GAROS: HALs | Ground Vehicle at HS | VD-1 VD-2 | Pedestrians or privately owned vehicles not authorized on the movement area attempt to enter runway when another aircraft is on the runway | Prevention |
| GAROS: TALs | Pilot in position for takeoff | PD-3 | Pilots misunderstand communications issued by an aircraft other than their own (downfield target violates protocol and enters occupied runway) | Reaction |

Towered Fields Without ASDE/AMASS

Four scenarios for towered fields without ASDE/AMASS are presented in this section:

Departing aircraft (See Drawing 11a and Table VII)
Arriving aircraft (See Drawing 12a and Table VIII.)
Multiple aircraft with a downfield active runway crossing. (See Drawings 13a and 14 and Table IX)
Multiple aircraft land over. (See Drawings 15a and 16 and Table X)

Each type of airfield has an associated application matrix that identifies runway incursion error type, causal factors, affected users and a mitigation category linked to ROWS™ system features used during the operational sequence. (See Table XI). Each of the four scenarios has an associated logic table. (See Drawings 11b, 12b, 13b, and 15b.)

TABLE VII

Mitigation Scenario for Controlled Airfield: Departing Aircraft
Departing Target 1 Enters/Exits Unoccupied Runway Zone

| Event Description | Objectives | | Sequence of Events |
|---|---|---|---|
| Departing target approaching unoccupied runway on departure roll | 1) Send visual alert to all ground and approaching aircraft that runway is occupied<br>2) Send visual confirmation to ATC of target position (level 2) | 1, 2)<br><br>3, 4)<br><br><br><br><br>5) | Ground target taxis into position and holds in hold short zone. GUI alert level 2 indicates target position in HS zone<br>Ground target taxis and holds in runway zone to prepare for takeoff. Output devices, including all FAROS, GAROS, and CTAF-RORS, are triggered to alert both ground and approaching traffic that runway is now occupied. GUI alert level 2 indicates target position in runway zone<br>Ground target exits runway zone. All FAROS, GAROS, and CTAF-RORS alerts turn off |

TABLE VII

Mitigation Scenario for Towered Airfield: Arriving Aircraft
Arriving Target Enters/Exits Unoccupied Runway Zone

| Event Description | Objectives | | Sequence of Events |
|---|---|---|---|
| Landing/arriving target exiting unoccupied runway | 1) Send visual alert to taxiing and approaching aircraft that runway is occupied<br>2) Send visual confirmation to ATC of target exit location | 1, 2)<br><br><br>3)<br><br><br>4) | Ground target enters runway zone. Output devices, including all FAROS, GAROS, and CTAF-RORS, are triggered to alert both ground and approaching traffic that runway is now occupied<br>Ground target taxis enters HS zone. All FAROS, GAROS, and CTAF-RORS alerts turn off, GUI alert level 2 indicates target position in hold short zone<br>Ground target exits hold short zone, GUI Level 2 indicates target leaving hold short zone |

TABLE IIIX

Mitigation Scenario for Towered Airfield: Multiple Aircraft with a Downfield Active Runway Crossing
Downfield Crossing onto Active Runway

| Event Description | Objectives | | Sequence of Events |
|---|---|---|---|
| Target 1 holding in takeoff position Downfield Target 2 holding short of runway is not aware of 1st target already on runway | 1) Send visual alert to all ground and approaching aircraft that runway is occupied<br>2) Send visual alert to ATC of potential conflict on runway | 1, 2)<br><br><br>3)<br><br><br>4)<br><br><br>5) | Ground target taxis through HS zone and takes position in runway zone for takeoff. Output devices, including all FAROS, GAROS, and CTAF-RORS, are triggered to alert both ground and approaching traffic that runway is now occupied<br>Ground target 2 disregards HALs and enters runway. TALs turn on alerting target 1 to hold takeoff pattern. GUI conflict alert signals ATC of potential conflict<br>Ground target 2 exits detection zone 2. TALs turn off, but all FAROS, GAROS, and CTAF-RORS remain on due to presence of target 1 in zone 1.<br>Ground target 1 exits detection zone 1. All FAROS, GAROS, and CTAF-RORS turn off, unless optional timer is initiated. |

TABLE X

Mitigation Scenario for Towered Airfield: Multiple Aircraft Landover
Ground Target 1 in Takeoff Position; Landing Target 2 Enters Occupied Runway (Landover)

| Event Description | Objectives | | Sequence of Events |
|---|---|---|---|
| Target 1 holding in takeoff position Landing target 2 lands over Target 1 onto occupied runway and subsequently exits runway | 1) Send visual alert to all ground and approaching aircraft that runway is occupied 2) Send visual alert to ATC of potential conflict on runway | 1, 2) 3) 4) 5) | Ground target taxis through HS zone and takes position in runway zone for takeoff. Output devices, including all FAROS, GAROS, and CTAF-RORS, are triggered to alert both ground and approaching traffic that runway is now occupied Ground target 2 "lands over" Target 1 at a downfield location, crossing into runway zone 2. TALs turn on alerting target 1 to abort takeoff roll Ground target 2 exits runway. TALs turn off, all FAROS, GAROS, and CTAF-RORS remain on due to presence of Target 1 in zone 1. Ground target exits detection zone 1. All FAROS, GAROS, and CTAF-RORS alerts turn off |

TABLE XI

ROWS ™ Application Matrix for Towered Airfield

| ROWS ™ Feature | User Affected | Error TYPE | Causal Factor Addressed | Mitigation Category |
|---|---|---|---|---|
| FAROS: VASI/PAPI | Pilot on Approach | PD-4 | Target enters runway when an approaching aircraft is landing | Prevention |
| CTAF-RORS | Pilot on Approach | PD-4 | Target enters runway when an approaching aircraft is landing | Prevention |
| GAROS: HALs | Taxiing Pilot at HS | PD-2 | Target fails to hold short of the runway and crosses or taxies into position on the runway | Prevention |
| GAROS: HALs | Ground Vehicle at HS | VD-1 VD-2 | Pedestrians or privately owned vehicles not authorized on the movement area attempt to enter runway when another aircraft is on the runway | Prevention |
| GAROS: TALs | Pilot in position for takeoff | PD-3 | Pilots misunderstand communications issued by an aircraft other than their own (downfield target violates protocol and enters occupied runway) | Reaction |
| GUI Level 1: Forgotten Target Conflict Alert Blind Spot/Hot Spot | Ground/ Local ATC | OE-1 OE-2 OE-3 | Controllers momentarily forget about an aircraft, vehicle, a previously issued clearance, or a runway closure; Controllers and pilots or vehicle operators commit communication errors (e.g., read back or hear back errors) Tower controllers fail to coordinate with each other in the handling of aircraft on the surface | Prevention/ Reaction |
| GUI Level 2: GUI Level 1 plus All zones in alert state | Ground/ Local ATC | OE-1 OE-2 OE-3 OE-5/ PD-4/ VD-3 | Controllers momentarily forget about an aircraft, vehicle, a previously issued clearance, or a runway closure; Controllers and pilots or vehicle operators commit communication errors (e.g., read back or hear back errors) Tower controllers fail to coordinate with each other in the handling of aircraft on the surface Controllers/Pilots/Vehicles not able to identify target position due to poor visibility | Prevention/ Reaction |
| GUI Level 3: GUI Level 2 plus Restricted access alert | Ground/ Local ATC | OE-1 OE-2 OE-3 OE-5/ PD-4/ VD-3 | Controllers momentarily forget about an aircraft, vehicle, a previously issued clearance, or a runway closure; Controllers and pilots or vehicle operators commit communication errors (e.g., read back or hear back errors) Tower controllers fail to coordinate with each other in the handling of aircraft on the surface Controllers/Pilots/Vehicles not able to identify target position due to poor visibility | Prevention/ Reaction |

Towered Fields With Existing Surveillance Equipment such as ASDE/AMASS

Three scenarios for towered fields with ASDE/AMASS are presented in this section:
Point detection (See Drawing 17).
Bounded Zone (See Drawing 18).
Tracking (See Drawing 19).

Mitigation scenarios are described in Table 12.

TABLE XII

Mitigation Scenario for Towered Airport with ASDE/AMASS
Target 1 Enters/Exits Hot Spot/Blind Spot Zone

| Event Description | Objectives | Sequence of Events |
| --- | --- | --- |
| Target 1 enters a zone that has been defined as a blind spot or hot spot | Detection data to provide target location or sensor verification to fusion processor Depending on the operational requirements, the zone can be: 1) a single loop for point detection only; 2) "bounded" for entry and exit zone detection; or 3) looped in a series to provide tracking information to the ASDE/AMASS system | Ground target approaches and enters hot/blind spot. As target enters the zone, notification will be sent to fusion server of target position Detection algorithms<br>a) Single loop detection: target crossing indicated to fusion server<br>b) Bounded zone: target entry and exit indicated to fusion server<br>c) For tracking configuration: target position indicated to fusion server |

Method of Operation of the Perimeter Access Security System Embodiment

Figure 1A:
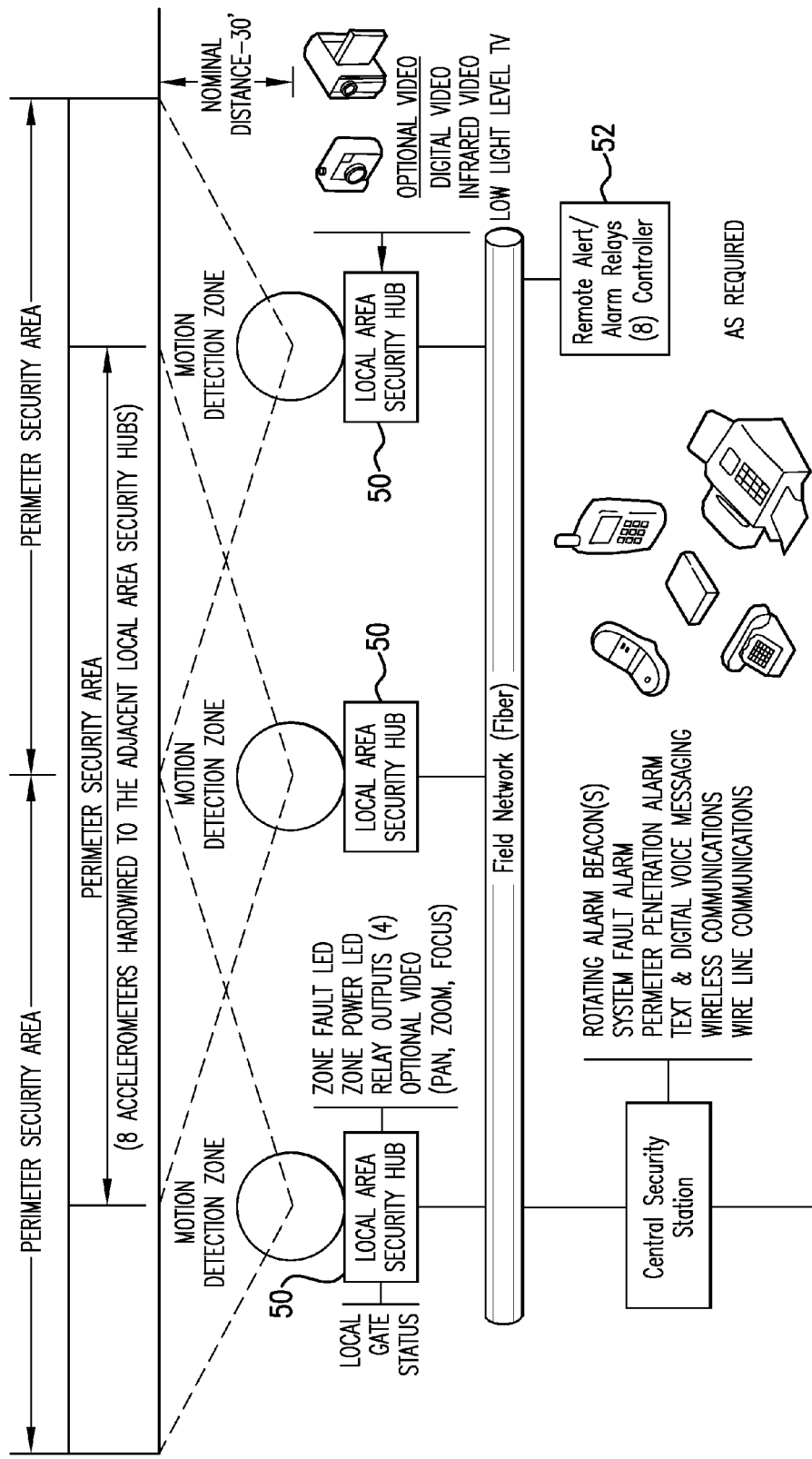
FIG. 1 is a schematic drawing showing the high-level system architecture of an embodiment of a perimeter access security system according to the invention.
Figure 1B:
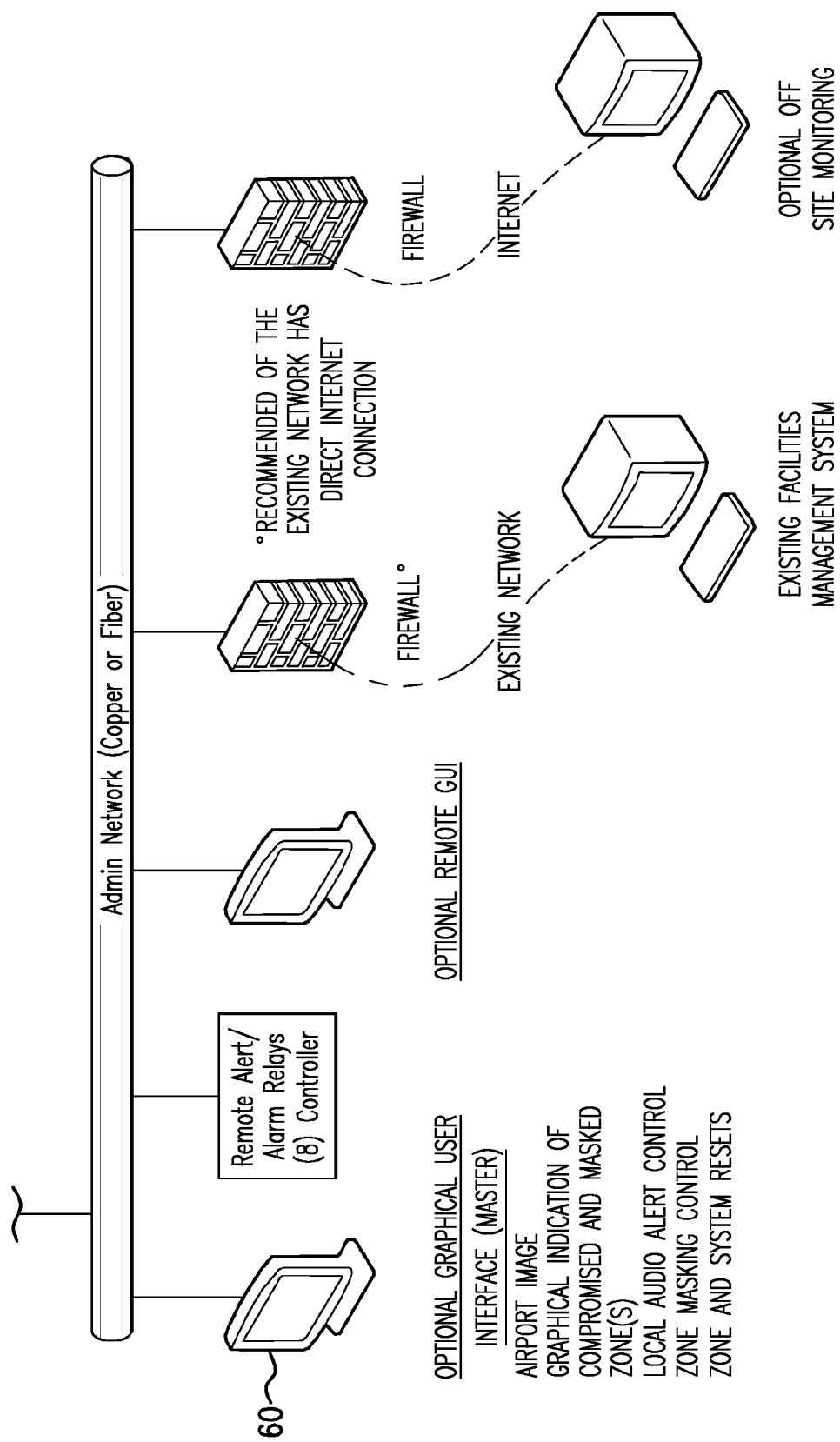

In another embodiment of the system according to the present invention, as shown schematically in FIG. 1, a series of accelerometers are preferably grouped to form perimeter security areas ("PSAs") that overlap to provide overlapping adjacent security areas to provide system redundancy of preferably 50%. Each accelerometer is connected, preferably by hard wiring, to a local area security hub ("LASH") to form desired overlapping patterns.

Each LASH provides DC power and receives analog real-time data from the connected detectors. The LASH converts the analog detector data to digital and passes the data to a central security processor ("CSP") over a field network 52. Each LASH also processes its detector data to determine the status of the associated PSA integrity and the detector status. Each LASH also preferably has a power-on LED and has relay outputs to control local area lighting, such as rotating beacons, audio alarms, or illumination lighting controls.

When using fence-line accelerometers ("FLAs") as detectors along a fence, the CSP receives and processes the raw acceleration data and status of each installed detector, preferably every 40 milliseconds. The CSP constantly monitors the delta change in acceleration for the entire perimeter fence line. This permits the CSP to detect sharp accelerations generated by climbing, cutting, or other impact actions upon the fence, while filtering normal operational events. When the CSP detects a perimeter incursion, it provides an alert/alarm through a number of co-resident alert and alarm relays, and it issues alert/alarm commands to remote alert/alarm panel(s), to an optional graphical user interface ("GUI"), and to the applicable LASH. The method and level of alert/alarms is selectable by an operator.

Preferably, the CSP is built around a high reliability single board computer (SBC) that executes software under an embedded operating system, preferably LINUX®, which continually processes all detection and surveillance data to derive and catalog perimeter data patterns, thereby building a dynamic model of the ambient environment. Through this continuous refinement, the system according to the invention will reduce the number of false alerts and alarms.

The CSP may also be connected to a primary graphical user interface ("GUI") 60, preferably a touch screen display, through an onboard Ethernet interface. When this interface is used to provide connectivity to an optional administrative network, the primary GUI is installed on the administrative network. The CSP provides a number of relay outputs for lighting controls, rotating beacons, and audio alerts/alarms. An RS-232 serial COM port can be included for wire line or wireless notification to applicable security personnel of alerts/alarms.

The CSP also preferably contains a media converter to translate the "copper-based" Ethernet to fiber optics. This is necessary where communications with the LASH will exceed three hundred feet. The CSP may also interface with existing gate access systems, directly or via the administrative network, to provide access control and status for remote gates via the LASH and a field network. The system also supports the addition of video, voice and text communications.

The perimeter access security system according to the present invention also comprises a field network 52, which functions as the central artery of the system. The field network preferably provides TCP/IP connectivity and 115 VAC, 60 Hz power to each LASH, but can provide other connectivity or use a different communications protocol. For a very large perimeter, the field network is preferably a conduit trenched between each LASH and containing a multi-load fiber-optic cable and the aforementioned AC power. For testing and demonstration purposes, spread-spectrum radios may be used in place of the buried fiber. However, radio frequency represents a temporary solution that may prove intermittent and unreliable in an airport or other noisy environment.

The local area security hub preferably operates a commercial off-the-shelf (COTS), high reliability CSP SBC, and the same LINUX®-based software as the CSP to gather and process data from its PSA. The LASH also contains a media controller to translate its Ethernet interface to the field network fiber. In addition to installed detection and surveillance equipment, the LASH provides I/O for existing gate access authorization hardware and issues gate commands when authorized. An access request, read by existing equipment, is passed to an existing authorization system via the field network and the CSP. The authorization is returned to the LASH via the CSP and field network with instructions to a gate operator. If desired, video cameras, voice communications and text messaging panels may be installed and are supported by the CSP and LASH.

The LASH provides local status LED indicators for power and on-line indications, relays for alerting and illumination control, and analog and digital I/O to provide data acquisition and control for an array of detection and surveillance sensors, including raw or processed camera technologies.

Each LASH is preferably installed within a NEMA 1, weather-resistant enclosure mounted on a PVC pedestal approximately 3 ft. above the ground. The pedestal is hollow to permit the FLA cables and field fiber/power to be pulled and wired. The pedestal top is sufficient to support camera equipment and control installations.

For installations covering extensive territory, an optional GUI can be used to provide configuration and management of the security system. The GUI is presented to the user, preferably on a touch screen display. The default screen is preferably an image, to scale, of the perimeter under surveillance, with soft switches and indicators for system power, display brightness and contrast, alert/alarm acknowledgment, perimeter area override, and screen menu selection. The screen menu preferably provides navigation through configuration of alerts, alarms, area illumination, camera controls, and other configurable parameters.

Alerts and alarms are preferably displayed on the default screen as soft switches highlighting the applicable area(s) of the perimeter. Selection of the soft switch will permit the user to drill down to identify the affected area(s) of the perimeter. Once identified, an authorized user can override the affected area for a selected period of time. The GUI also allows for manual control of local area alerts/alarms and illumination.

User-programmable remote alerting and/or alarms may be installed at any location accessible to the field or administrative networks. Installations at other locations may be provided over a firewall-protected connection to the administrative network from an existing facility network or from the Internet. Remote, display-only GUIs may also be provided using this latter connection. The remote alert/alarm is recommended at a designated emergency response facility. A standard LASH unit, connected to the field network, provides the usual audio alerts/alarms programmed by a security manager.

An additional level of security can be achieved through the installation of infrared or other motion detection systems to cover the area between the LASH line and the perimeter fence. The LASH supports the physical installation and data interface for this equipment. This detection technology is preferably installed to provide matching, overlapping PSA coverage for each LASH. A number of commercial-off-the-shelf ("COTS") infrared intrusion sensors exist with sufficient range and discrimination to detect a human presence while screening out small animals. Scanning infrared and laser detection technology can provide backup coverage to that provided by the FLA's.

Depending upon the objectives of a security plan, whether deterrence or arrest, it may be desirable to have the ability to automatically or manually control local illumination when illumination is invisible to the naked eye, yet it provides sufficient illumination to take and process digital infrared photography and video.

It is recommended violations or security breaches occur. For deterrence, visible illumination is most often used. Turning on lights tends to send ordinary vandals fleeing. Infrared that only ruggedized digital camera equipment be used for this type of application. Selected cameras can be installed to an applicable LASH using serial, parallel, Ethernet, or TCP/IP compatible connections. The lash will support most camera systems, including color, black-and-white, and infrared, fixed, scanning, or tracking The use of infrared cameras can easily be coordinated with infrared illumination. These system according to the present invention can also support image-tracking cameras, including target handoffs between adjacent to cameras.

With extensive perimeters and where a perimeter is obstructed from the ground level to any appreciable distance, problems are presented for much of the existing COTS wireless technology. The density of obstructing trees and buildings presents signal absorption problems, compounded by the locations at the farthest distances from the likely CSP locations. To meet distance requirements, link equipment will likely have to operate in the commercially available spectrum, which may be quite crowded due to traffic in the vicinity of a facility under security surveillance. This may result in unreliable links and false perimeter status and alerts. Finally, while the LASH and FLA equipment draw low power and can be operated using solar/battery power sources, the maintenance requirements of these power sources can lead to decreased availability and reliability.

A wireless network could be used to provide the link between the CSP and the primary GUI or the administrative network. Depending on the location of the CSP, superior wireless links may be available. However, as noted above, a facility located in an area with extensive COTS wireless networking may experience interference with perimeter security operation. A wireless network can be attached to the system for demonstrations and/or setting up temporary security zones using spike-mounted LASH units with solar/battery/generator power sources and a wireless network field connection.

Another option for wireless networking is to install a wireless network at each LASH, thereby creating an overlay wireless network along the perimeter, which is used to maintain communication and track security personnel using personal digital assistants, laptops, and the like. Field personnel would have access to a remote GUI on a PDA or laptop and could receive images or tracking video of a potential intruder.

The invention claimed is:

1. A method comprising the steps of:
   (a) detecting the movement by an object across a boundary of a detection zone of an airfield or the presence of an object within the detection zone, or both, by a plurality of sensors;
   (b) generating detection zone status data by a detection hub connected to the plurality of sensors based on the sensor signals;
   (c) transmitting the detection zone status data from the detection hub to a central processor via a field network;

(d) processing the detection zone status data by the central processor to determine the occupancy status of the detection zone; and (e) activating runway status output devices based on the occupancy status of the detection zone.

2. The method according to claim 1, wherein the plurality of sensors are selected from the group consisting of electromagnetic, pressure, optical, radio frequency, sonar, and electromechanical sensors.

3. The method according to claim 1, wherein the sensors are grouped to form detection zones that overlap.

4. The method according to claim 1, wherein the sensors are connected to detection hubs to form overlapping adjacent detection zones.

5. The method according to claim 1, wherein the outputs from the runway status output devices correlate with the occupancy status of the detection zone.

6. The method according to claim 1, wherein the runway status output devices are controlled by the detection hubs during the activating step (e).

7. The method according to claim 1, wherein the sensors comprise one or more inductive loops, ground pressure detectors, infrared scanning and fixed beam sensors, ranging radars targeted along the center line of the runway, or position radars to cover defined airfield zones.

8. The method according to claim 1, wherein the runway status output devices comprise one or more of the following: local area lighting, rotating beacons, audio alarms, illumination lighting controls, cameras, audio-visual recorders, text messaging devices, digital voice messaging devices, wireless communicators, wire line communicators, and graphical user interfaces.

9. The method according to claim 8, wherein the runway status output devices comprise final approach runway occupancy signal (FAROS), ground alert runway occupancy signal (GAROS), or common traffic advisory frequency-runway occupancy radio signal (CTAF-RORS) output devices.

10. The method according to claim 1, wherein the central processor and the detection hubs can operate during steps (b) through (e) without an air traffic control tower.

11. The method according to claim 1, further comprising the step of (f) pushing status data to a graphical user interface from the central processor via an administrative network.

12. The method according to claim 11, wherein the graphical user interface is present in the air traffic control tower for the airfield.

13. A perimeter access security system comprising:

a plurality of detectors grouped to form one or more perimeter security areas that overlap to provide overlapping adjacent perimeter security areas;

one or more local area security hubs connected to one or more of the detectors for receiving data from the one or more detectors;

a central security processor; and a field network, wherein each of the local area security hubs is connected to the central security processor via the field network for passing the detector data to the central security processor, and wherein an output is generated whenever an incursion by an intruder is detected.

* * * * *